US012614194B2

(12) United States Patent
Suryanarayana et al.

(10) Patent No.: US 12,614,194 B2
(45) Date of Patent: *Apr. 28, 2026

(54) COMPLIANCE EVALUATION SYSTEM FOR AN ORGANIZATION

(71) Applicant: People Center, Inc., San Francisco, CA (US)

(72) Inventors: Sachin Aralasurali Suryanarayana, Bangalore (IN); Tomer Schwartz, Palo Alto, CA (US); Parthasarathy Jeyaram, Trichy (IN); Prateek Agarwal, Jhansi (IN); Shubham Choudhary, Bangalore (IN); Sanket Singhal, Ranchi (IN); Sanjay Lal Bhavnani, Kutch (IN)

(73) Assignee: People Center, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,761

(22) Filed: Feb. 8, 2024

(65) Prior Publication Data

US 2024/0185261 A1 Jun. 6, 2024

Related U.S. Application Data

(63) Continuation of application No. 17/860,841, filed on Jul. 8, 2022, now Pat. No. 11,935,071.

(30) Foreign Application Priority Data

May 13, 2022 (IN) .............................. 202211027765

(51) Int. Cl.
G06Q 30/018 (2023.01)
G06F 16/901 (2019.01)
(Continued)

(52) U.S. Cl.
CPC ....... *G06Q 30/018* (2013.01); *G06F 16/9024* (2019.01); *G06Q 10/105* (2013.01); *G06Q 50/18* (2013.01)

(58) Field of Classification Search
CPC .... G06Q 30/018; G06Q 10/105; G06Q 50/18; G06F 16/9024
See application file for complete search history.

(56) References Cited

U.S. PATENT DOCUMENTS 8,359,221 B2 * 1/2013 Gala ................ G06Q 10/06398
                                                                                 705/7.17
8,799,243 B1 * 8/2014 Havlik .................. G06Q 10/105
                                                                                 707/694

(Continued)

OTHER PUBLICATIONS

Sunkle, Sagar, Deepali Kholkar, and Vinay Kulkarni. "Model-driven regulatory compliance: a case study of "Know Your Customer" regulations." 2015 ACM/IEEE 18th International Conference on Model Driven Engineering Languages and Systems (Models). IEEE, 2015. (Year: 2015).*

(Continued)

*Primary Examiner* — Corey Russ
(74) *Attorney, Agent, or Firm* — Dority & Manning, P.A.

(57) ABSTRACT

A computing system that determines employee and organizational compliance includes one or more databases that store organizational data and one or more processors to execute instructions to perform various operations. The operations include accessing, from the organizational data, employee information associated with a first employee object, accessing, from the organizational data, jurisdictional information associated with a first jurisdiction object, importing one or more compliance parameters relating to the first jurisdiction object to generate one or more compliance rules parameterized for the first jurisdiction object, determining compliance with the one or more compliance rules (Continued)

parameterized for the first jurisdiction object with respect to the first employee object, based on the employee information and the one or compliance parameters, and providing an output indicating whether the one or more compliance rules parameterized for the first jurisdiction object are being complied with, with respect to the first employee object.

20 Claims, 12 Drawing Sheets

(51) Int. Cl.
  *G06Q 10/105*     (2023.01)
  *G06Q 50/18*     (2012.01)

(56) References Cited

U.S. PATENT DOCUMENTS

| | | | | |
|---|---|---|---|---|
| 9,465,951 | B1* | 10/2016 | Cudmore | G06F 21/6218 |
| 2002/0184148 | A1* | 12/2002 | Kahn | G06Q 40/02 |
| | | | | 705/40 |
| 2003/0018487 | A1 | 1/2003 | Young et al. | |
| 2003/0131011 | A1* | 7/2003 | Haunschild | G06Q 10/10 |
| 2004/0064328 | A1 | 4/2004 | Keranen | |
| 2004/0083220 | A1 | 4/2004 | Moro et al. | |
| 2004/0243428 | A1* | 12/2004 | Black | G06Q 10/105 |
| | | | | 705/320 |
| 2005/0071185 | A1* | 3/2005 | Thompson | G06Q 10/10 |
| | | | | 705/317 |
| 2005/0187862 | A1 | 8/2005 | Dheer et al. | |
| 2005/0228688 | A1* | 10/2005 | Visser | G06Q 30/018 |
| | | | | 705/317 |
| 2006/0265295 | A1* | 11/2006 | Feanny | G07C 1/10 |
| | | | | 705/32 |
| 2007/0061156 | A1* | 3/2007 | Fry | G06Q 99/00 |
| | | | | 705/320 |
| 2008/0091676 | A1* | 4/2008 | Zwilling | G06Q 10/06395 |
| 2008/0262863 | A1* | 10/2008 | Stickley | H04L 63/10 |
| | | | | 726/1 |
| 2009/0326997 | A1* | 12/2009 | Becker | G06Q 10/06393 |
| | | | | 705/7.39 |
| 2010/0030718 | A1* | 2/2010 | Anderson | G06F 16/248 |
| | | | | 705/36 R |
| 2013/0332891 | A1* | 12/2013 | Schmitlin | G06F 3/0484 |
| | | | | 715/853 |
| 2014/0006296 | A1* | 1/2014 | Hughes | A61F 13/5655 |
| | | | | 705/317 |
| 2014/0067448 | A1 | 3/2014 | Joshi et al. | |
| 2014/0279610 | A1 | 9/2014 | Hendrix | |
| 2014/0358748 | A1* | 12/2014 | Goyette | G06Q 40/125 |
| | | | | 705/32 |
| 2015/0073823 | A1* | 3/2015 | Ladd | G06F 16/9535 |
| | | | | 705/2 |
| 2015/0281287 | A1 | 10/2015 | Gill et al. | |
| 2015/0347978 | A1* | 12/2015 | Tyack | G06Q 10/1057 |
| | | | | 705/322 |
| 2015/0348215 | A1 | 12/2015 | Doll et al. | |
| 2016/0350765 | A1* | 12/2016 | Clark | G06Q 50/18 |
| 2017/0316361 | A1 | 11/2017 | Jagota et al. | |
| 2018/0330812 | A1* | 11/2018 | Sheppard | G06Q 30/018 |
| 2018/0374047 | A1* | 12/2018 | Sarkar | G06F 16/248 |
| 2019/0230088 | A1 | 7/2019 | Rice et al. | |
| 2020/0050620 | A1* | 2/2020 | Clark | G06N 20/00 |
| 2020/0125998 | A1 | 4/2020 | Johnson | |
| 2020/0380436 | A1* | 12/2020 | Bonomo | G06Q 10/1091 |
| 2021/0012254 | A1* | 1/2021 | Campbell | G06Q 30/0185 |
| 2021/0097553 | A1 | 4/2021 | Degeneffe et al. | |
| 2021/0142432 | A1 | 5/2021 | Reynolds et al. | |
| 2021/0248526 | A1* | 8/2021 | Greenberg | G06Q 10/0633 |
| 2021/0279827 | A1* | 9/2021 | Kucksdorf | G06F 3/147 |
| 2021/0397735 | A1* | 12/2021 | Samatov | G06F 9/451 |
| 2022/0215402 | A1* | 7/2022 | Degeneffe | H04W 4/021 |

OTHER PUBLICATIONS

Aggarwal et al., "Design and Implementation: a Review of Payroll Management System", 2022 4th International Conference on Advances in Computing, Communication Control and Networking (ICAC3N), IEEE, 2022, pp. 26-32.
Gudivada et al., "Corporate Compliance and its Implications to IT Professionals", 2009 Sixth International Conference on Information Technology: New Generations, IEEE, 2009, pp. 725-729.
International Search Report and Written Opinion for Application No. PCT/US2023/021862, mailed Aug. 14, 2023, 10 pages.

* cited by examiner

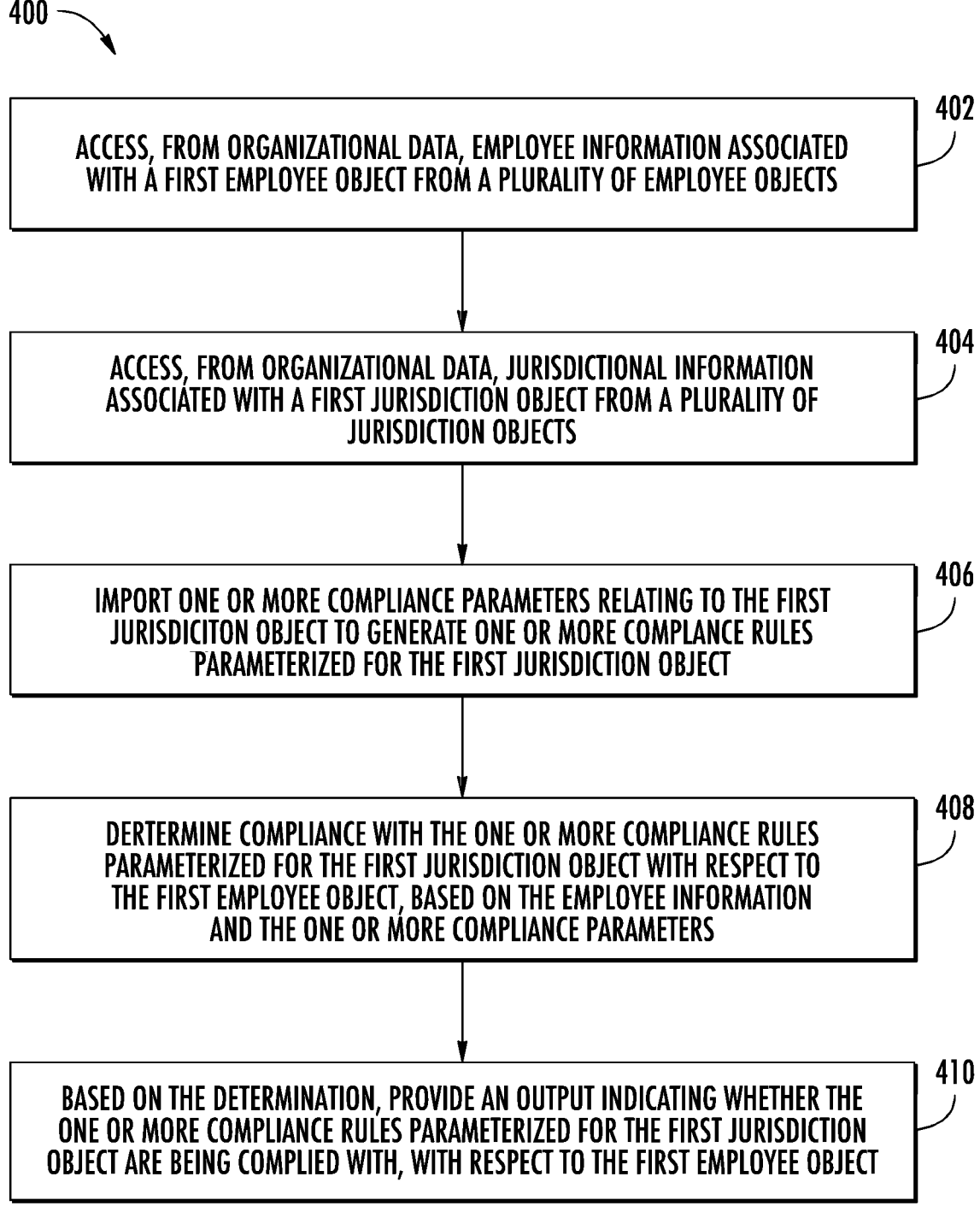

400

ACCESS, FROM ORGANIZATIONAL DATA, EMPLOYEE INFORMATION ASSOCIATED WITH A FIRST EMPLOYEE OBJECT FROM A PLURALITY OF EMPLOYEE OBJECTS
402

ACCESS, FROM ORGANIZATIONAL DATA, JURISDICTIONAL INFORMATION ASSOCIATED WITH A FIRST JURISDICTION OBJECT FROM A PLURALITY OF JURISDICTION OBJECTS
404

IMPORT ONE OR MORE COMPLIANCE PARAMETERS RELATING TO THE FIRST JURISDICITON OBJECT TO GENERATE ONE OR MORE COMPLANCE RULES PARAMETERIZED FOR THE FIRST JURISDICTION OBJECT
406

DERTERMINE COMPLIANCE WITH THE ONE OR MORE COMPLIANCE RULES PARAMETERIZED FOR THE FIRST JURISDICTION OBJECT WITH RESPECT TO THE FIRST EMPLOYEE OBJECT, BASED ON THE EMPLOYEE INFORMATION AND THE ONE OR MORE COMPLIANCE PARAMETERS
408

BASED ON THE DETERMINATION, PROVIDE AN OUTPUT INDICATING WHETHER THE ONE OR MORE COMPLIANCE RULES PARAMETERIZED FOR THE FIRST JURISDICTION OBJECT ARE BEING COMPLIED WITH, WITH RESPECT TO THE FIRST EMPLOYEE OBJECT
410

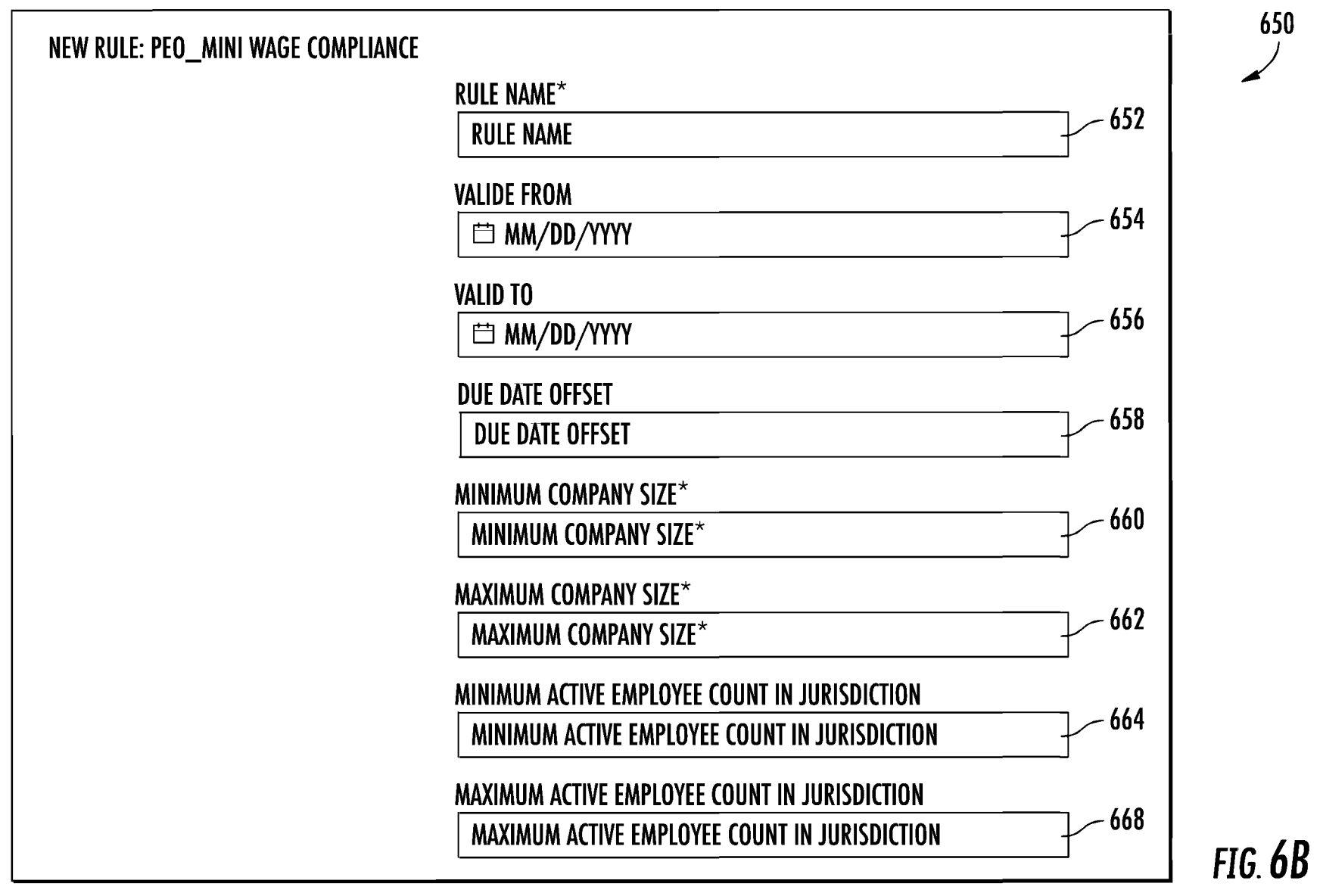

NEW RULE: PEO_MINI WAGE COMPLIANCE

RULE NAME*
RULE NAME — 652

VALIDE FROM
📅 MM/DD/YYYY — 654

VALID TO
📅 MM/DD/YYYY — 656

DUE DATE OFFSET
DUE DATE OFFSET — 658

MINIMUM COMPANY SIZE*
MINIMUM COMPANY SIZE — 660

MAXIMUM COMPANY SIZE*
MAXIMUM COMPANY SIZE — 662

MINIMUM ACTIVE EMPLOYEE COUNT IN JURISDICTION
MINIMUM ACTIVE EMPLOYEE COUNT IN JURISDICTION — 664

MAXIMUM ACTIVE EMPLOYEE COUNT IN JURISDICTION
MAXIMUM ACTIVE EMPLOYEE COUNT IN JURISDICTION — 668

FIG. 6B

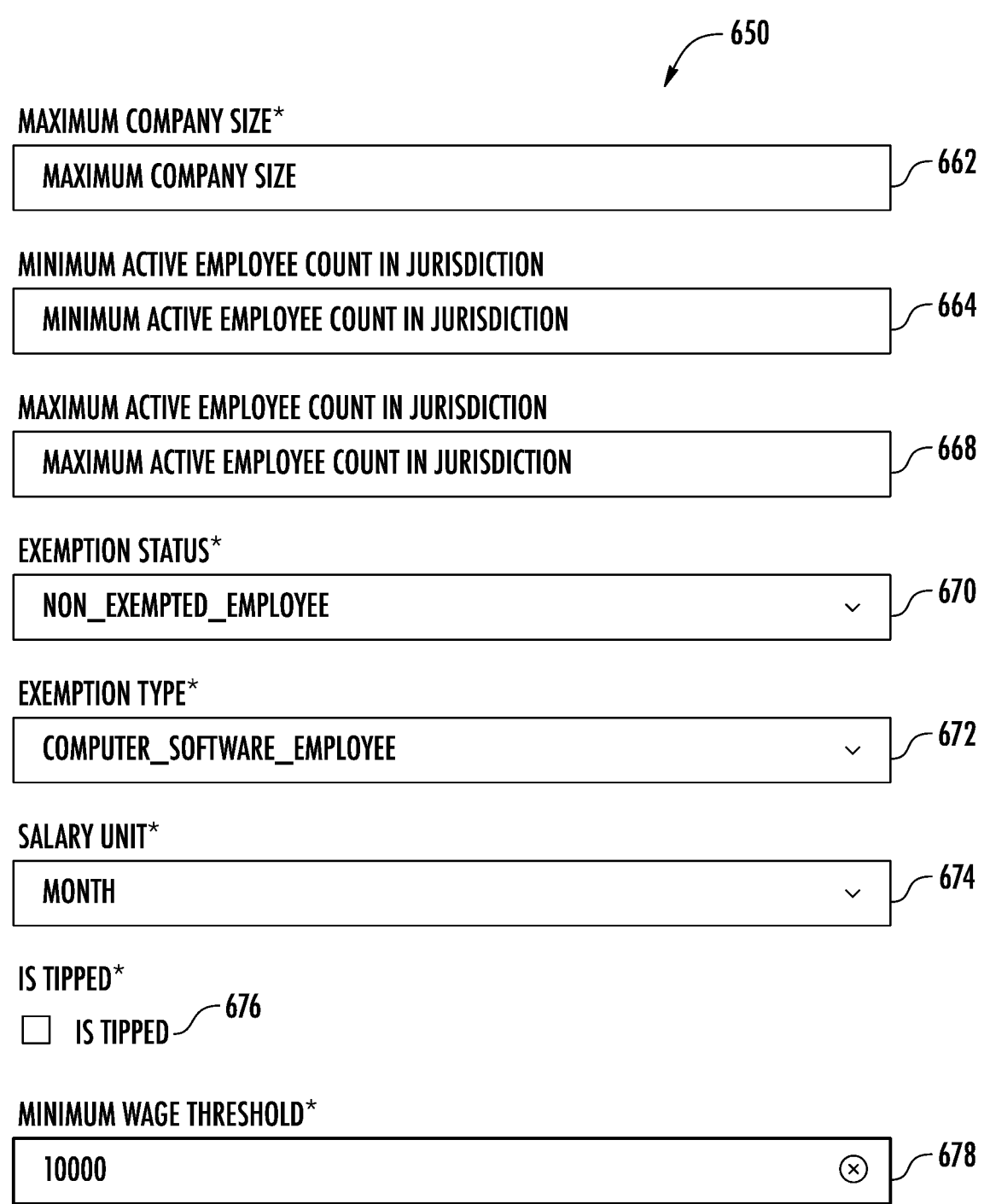

650

MAXIMUM COMPANY SIZE*

| MAXIMUM COMPANY SIZE |
662

MINIMUM ACTIVE EMPLOYEE COUNT IN JURISDICTION

| MINIMUM ACTIVE EMPLOYEE COUNT IN JURISDICTION |
664

MAXIMUM ACTIVE EMPLOYEE COUNT IN JURISDICTION

| MAXIMUM ACTIVE EMPLOYEE COUNT IN JURISDICTION |
668

EXEMPTION STATUS*

| NON_EXEMPTED_EMPLOYEE                    ⌄ |
670

EXEMPTION TYPE*

| COMPUTER_SOFTWARE_EMPLOYEE               ⌄ |
672

SALARY UNIT*

| MONTH                                   ⌄ |
674

IS TIPPED*

☐ IS TIPPED — 676

MINIMUM WAGE THRESHOLD*

| 10000                                   ⊗ |
678

TOTAL OUTSTANDING ISSUES $

NEW ISSUES IN PAST 30 DAYS $

AVERAGE TIME TO RESOLVE

NOT ENOUGH DATA

OUTSTANDING ISSUES BY PRIORITY

○ VERY HIGH
0

○ HIGH
5

● MEDIUM
0

○ LOW
0

OPEN ISSUES · SHOWING 5 OF 5

Q SEARCH    702

▼ ADD FILTERS 704    706

| DATA DETECTED ▼ | EMPLOYEE ◆ | RESOLUTION DEADLINE ▼ | URGENCY ▼ | LEAVE TYPE ▼ | |
|---|---|---|---|---|---|
| 04/05/2022 |  JOHN DOE<br>DIRECTOR OF PEOPLE S... | 04/12/2022 | ○ HIGH | SICK LEAVE VIOLATION | ··· ∧ |
| 04/05/2022 | CHRIS DOE<br>VP OF BUSINESS... | 04/12/2022 | ○ HIGH | SICK LEAVE VIOLATION | ··· ∧ |
| 04/05/2022 | JIM DOE<br>COMPANY CONSULTAN... | 04/12/2022 | ○ HIGH | SICK LEAVE VIOLATION | ··· ∧ |
| 04/05/2022 | MATTHEW DOE<br>COMPANY ARCHITECT,... | 04/12/2022 | ○ HIGH | SICK LEAVE VIOLATION | ··· ∧ |
| 04/05/2022 | SHEFTY DOE<br>DIRECTOR OF ORGANIZ... | 04/12/2022 | ○ HIGH | SICK LEAVE VIOLATION | ··· ∧ |

Figure 7B:
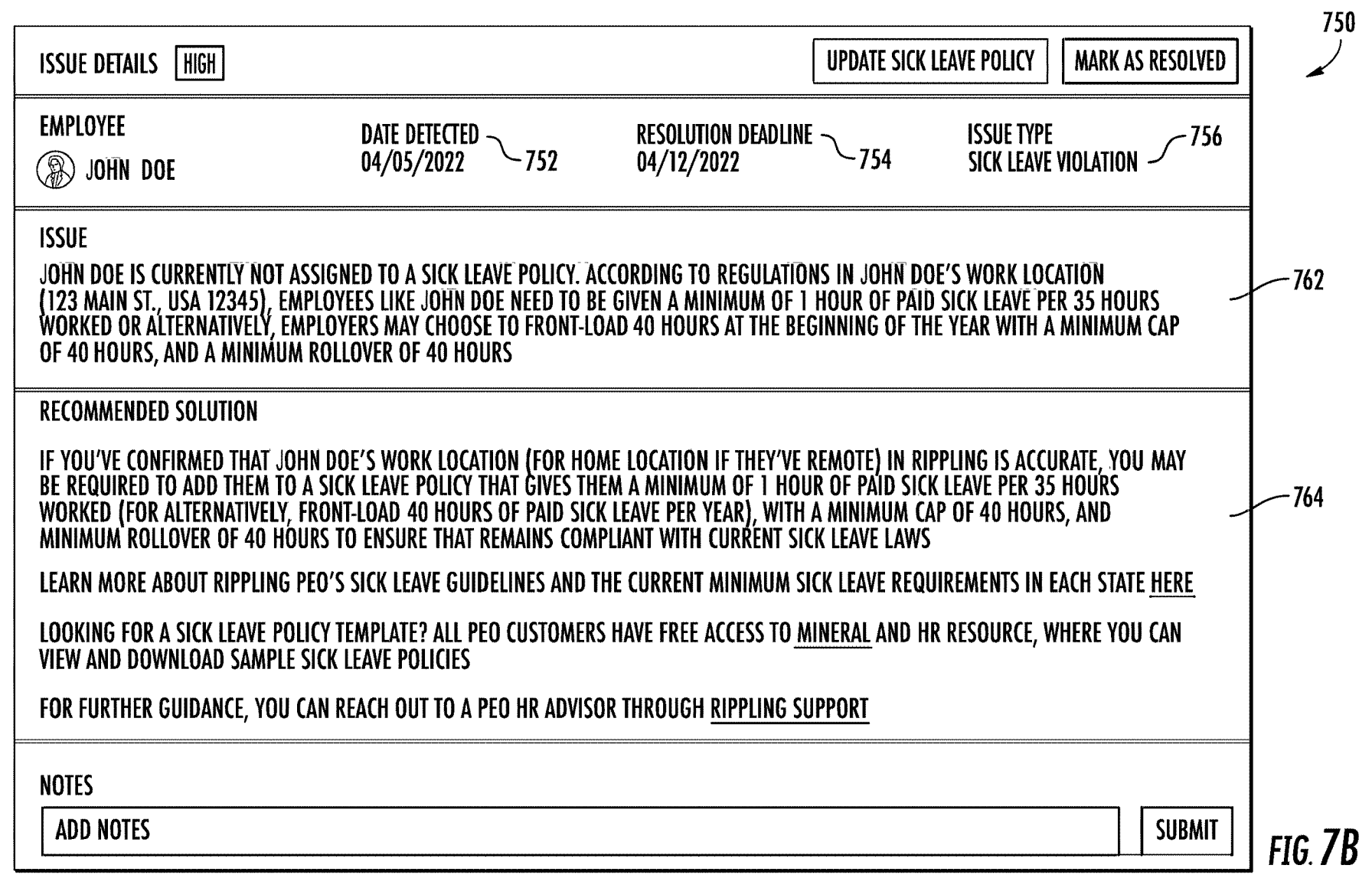

ISSUE DETAILS  [HIGH]

UPDATE SICK LEAVE POLICY    [MARK AS RESOLVED]

EMPLOYEE

DATE DETECTED — 752
04/05/2022

RESOLUTION DEADLINE — 754
04/12/2022

ISSUE TYPE
SICK LEAVE VIOLATION — 756

JOHN DOE

ISSUE

JOHN DOE IS CURRENTLY NOT ASSIGNED TO A SICK LEAVE POLICY. ACCORDING TO REGULATIONS IN JOHN DOE'S WORK LOCATION (123 MAIN ST., USA 12345), EMPLOYEES LIKE JOHN DOE NEED TO BE GIVEN A MINIMUM OF 1 HOUR OF PAID SICK LEAVE PER 35 HOURS WORKED OR ALTERNATIVELY, EMPLOYERS MAY CHOOSE TO FRONT-LOAD 40 HOURS AT THE BEGINNING OF THE YEAR WITH A MINIMUM CAP OF 40 HOURS, AND A MINIMUM ROLLOVER OF 40 HOURS

RECOMMENDED SOLUTION

IF YOU'VE CONFIRMED THAT JOHN DOE'S WORK LOCATION (FOR HOME LOCATION IF THEY'VE REMOTE) IN RIPPLING IS ACCURATE, YOU MAY BE REQUIRED TO ADD THEM TO A SICK LEAVE POLICY THAT GIVES THEM A MINIMUM OF 1 HOUR OF PAID SICK LEAVE PER 35 HOURS WORKED (FOR ALTERNATIVELY, FRONT-LOAD 40 HOURS OF PAID SICK LEAVE PER YEAR), WITH A MINIMUM CAP OF 40 HOURS, AND MINIMUM ROLLOVER OF 40 HOURS TO ENSURE THAT REMAINS COMPLIANT WITH CURRENT SICK LEAVE LAWS

LEARN MORE ABOUT RIPPLING PEO'S SICK LEAVE GUIDELINES AND THE CURRENT MINIMUM SICK LEAVE REQUIREMENTS IN EACH STATE <u>HERE</u>

LOOKING FOR A SICK LEAVE POLICY TEMPLATE? ALL PEO CUSTOMERS HAVE FREE ACCESS TO <u>MINERAL</u> AND HR RESOURCE, WHERE YOU CAN VIEW AND DOWNLOAD SAMPLE SICK LEAVE POLICIES

FOR FURTHER GUIDANCE, YOU CAN REACH OUT TO A PEO HR ADVISOR THROUGH <u>RIPPLING SUPPORT</u>

NOTES

[ADD NOTES]       [SUBMIT]

COMPLIANCE EVALUATION SYSTEM FOR AN ORGANIZATION

PRIORITY CLAIM

This application is a continuation of U.S. patent application Ser. No. 17/860,841, filed on Jul. 8, 2022, which is based on and claims the benefit of priority to Indian Application No. 202211027765, filed on May 13, 2022. This application claims priority to, benefit of, and incorporates by reference each of such applications and incorporates all such applications herein by reference in their entirety for all purposes.

FIELD

The disclosure relates generally to data management systems for one or more organizations. More particularly, the disclosure relates to data management systems including a compliance evaluation system which configures parametrized compliance rules for one or more jurisdictions associated with the one or more organizations.

BACKGROUND

The human resource (HR) demands of running a business can be time consuming and complex, especially with the increase in remote work, which requires managing compliance across multiple jurisdictions. Some data management systems utilize a database for an organization that includes various data of the organization (e.g., employee information).

Improving the effectiveness and ease with which employers, managers, executives, and the like can verify or ensure compliance with ordinances, rules, regulations, laws, etc. which are applicable to the organization and/or employees of the organization and may result in an improvement in the overall effectiveness of operations across the organization (e.g., by saving time), reduce errors (e.g., by avoiding human mistakes in monitoring compliance), reduce costs (e.g., by avoiding fines due to infractions as well as the labor-intensive costs of monitoring and evaluating compliance), improve safety (e.g., by ensuring compliance with applicable licensing rules or preventing employees from working or accessing organizational resources who are not in compliance), etc. Similarly, improving the speed, effectiveness, and ease with which employers, managers, executives, and the like can be made aware of compliance infractions and take appropriate corrective measures may result in an improvement in the overall effectiveness of operations across the organization, reduce errors, reduce costs, improve safety, etc. Accordingly, there exists a demand for a more effective way of managing and evaluating compliance within an organization.

SUMMARY

Aspects and advantages of embodiments of the disclosure will be set forth in part in the following description, or can be learned from the description, or can be learned through practice of the embodiments.

According to one or more example embodiments, a computing system for determining compliance for an organization, includes one or more processors, one or more databases that store organizational data associated with an organization, wherein the organizational data includes a plurality of employee objects respectively associated with a plurality of employees of the organization and a plurality of jurisdiction objects respectively associated with a plurality of jurisdictions, and one or more non-transitory computer-readable media that collectively store instructions that, when executed by the one or more processors, cause the computing system to perform operations. The operations include accessing, from the organizational data, employee information associated with a first employee object from the plurality of employee objects, accessing, from the organizational data, jurisdictional information associated with a first jurisdiction object from the plurality of jurisdiction objects, importing one or more compliance parameters relating to the first jurisdiction object to generate one or more compliance rules parameterized for the first jurisdiction object, determining compliance with the one or more compliance rules parameterized for the first jurisdiction object with respect to the first employee object, based on the employee information and the one or compliance parameters, and based on the determining, providing an output indicating whether the one or more compliance rules parameterized for the first jurisdiction object are being complied with, with respect to the first employee object.

In some implementations, the operations of importing and determining are triggered by and performed in response to at least one of a change in the employee information associated with the first employee object or a change in the one or more compliance rules parameterized for the first jurisdiction object.

In some implementations, the one or more compliance rules include query expressions that are expressed in a query language, and determining compliance with the one or more compliance rules includes evaluating the query expressions against a data object graph to return one or more query results.

In some implementations, the first employee object is associated with a first employee among the plurality of employees and the first jurisdiction object is associated with a first jurisdiction among the plurality of jurisdictions, and in response to the employee information associated with the first employee object being updated to indicate that the first employee has moved from a second jurisdiction among the plurality of jurisdictions to the first jurisdiction, the computing system is to perform the operations of importing the one or more compliance parameters relating to the first jurisdiction object and of determining compliance with the one or more compliance rules parameterized for the first jurisdiction object with respect to the first employee object, based on the updated employee information and the one or more compliance parameters.

In some implementations, the jurisdictional information associated with the first employee object includes geographic information about a first jurisdiction in which a first employee among the plurality of employees is employed, the first employee object being associated with the first employee, and the one or more compliance rules parameterized for the first jurisdiction object include at least one of minimum wage rules, vacation leave rules, overtime rules, sick leave rules, licensing rules, or termination rules.

In some implementations, the one or more compliance parameters relating to the first jurisdiction object include at least one of a company size for which a given compliance rule is applicable, a threshold value for a compensation amount during a given time period, an employee exemption status, or date information for which the one or more compliance rules are applicable.

In some implementations, providing the output indicating whether the one or more compliance rules parameterized for the first jurisdiction object are being complied with, with respect to the first employee object, includes providing an alert of one or more compliance infractions to be displayed on a user interface of a display device, when at least one of the one or more compliance rules parameterized for the first jurisdiction object are not being complied with, with respect to the first employee object.

In some implementations, providing the output indicating whether the one or more compliance rules parameterized for the first jurisdiction object are being complied with, with respect to the first employee object, includes: restricting access to one or more organizational resources for an employee corresponding to the first employee object, when at least one of the one or more compliance rules parameterized for the first jurisdiction object are not being complied with, with respect to the first employee object, and restoring access to the one or more organizational resources for the employee corresponding to the first employee object, when the at least one of the one or more compliance rules parameterized for the first jurisdiction object is subsequently complied with, with respect to the first employee object.

According to one or more example embodiments, a computer-implemented method of determining compliance for an organization includes accessing, by a computing system comprising one or more processors, employee information from organizational data stored in one or more databases, the employee information being associated with a first employee object from a plurality of employee objects which are stored in the one or more databases, accessing, from the organizational data, jurisdictional information associated with a first jurisdiction object from a plurality of jurisdiction objects which are stored in the one or more databases, importing one or more compliance parameters relating to the first jurisdiction object to generate one or more compliance rules parameterized for the first jurisdiction object, determining compliance with the one or more compliance rules parameterized for the first jurisdiction object with respect to the first employee object, based on the employee information and the one or compliance parameters, and based on the determining, providing an output indicating whether the one or more compliance rules parameterized for the first jurisdiction object are being complied with, with respect to the first employee object.

In some implementations, the importing and the determining are triggered by and performed in response to at least one of a change in the employee information associated with the first employee object or a change in the one or more compliance rules parameterized for the first jurisdiction object.

In some implementations, the one or more compliance rules include query expressions that are expressed in a query language, and determining compliance with the one or more compliance rules includes evaluating the query expressions against a data object graph to return one or more query results.

In some implementations, the first employee object is associated with a first employee among a plurality of employees of the organization and the first jurisdiction object is associated with a first jurisdiction among a plurality of jurisdictions, and in response to the employee information associated with the first employee object being updated to indicate that the first employee has moved from a second jurisdiction among the plurality of jurisdictions to the first jurisdiction, importing the one or more compliance parameters relating to the first jurisdiction object and compliance with the one or more compliance rules parameterized for the first jurisdiction object with respect to the first employee object, based on the updated employee information and the one or more compliance parameters.

In some implementations, the jurisdictional information associated with the first employee object includes geographic information about a first jurisdiction in which a first employee among a plurality of employees of the organization is employed, the first employee object being associated with the first employee, and the one or more compliance rules parameterized for the first jurisdiction object include at least one of minimum wage rules, vacation leave rules, overtime rules, sick leave rules, licensing rules, or termination rules.

In some implementations, the one or more compliance parameters relating to the first jurisdiction object include at least one of a company size for which a given compliance rule is applicable, a threshold value for a compensation amount during a given time period, an employee exemption status, or date information for which the one or more compliance rules are applicable.

In some implementations, providing the output indicating whether the one or more compliance rules parameterized for the first jurisdiction object are being complied with, with respect to the first employee object, includes providing an alert of one or more compliance infractions to be displayed on a user interface of a display device, when at least one of the one or more compliance rules parameterized for the first jurisdiction object are not being complied with, with respect to the first employee object.

In some implementations, the method further includes determining a time to cure the one or more compliance infractions, and providing one or more notifications to one or more employees of the organization indicating the time to cure the one or more compliance infractions.

In some implementations, providing the output indicating whether the one or more compliance rules parameterized for the first jurisdiction object are being complied with, with respect to the first employee object, includes: restricting access to one or more organizational resources for an employee corresponding to the first employee object, when at least one of the one or more compliance rules parameterized for the first jurisdiction object are not being complied with, with respect to the first employee object, and restoring access to the one or more organizational resources for the employee corresponding to the first employee object, when the at least one of the one or more compliance rules parameterized for the first jurisdiction object is subsequently complied with, with respect to the first employee object.

In some implementations, the importing the one or more compliance parameters relating to the first jurisdiction object to generate the one or more compliance rules parameterized for the first jurisdiction object includes: receiving, by the computing system, one or more inputs via a graphical user interface configured to display one or more settable parameters for configuring the one or more compliance rules for the first jurisdiction object, wherein the one or more settable parameters include at least one of a company size for which a given compliance rule is applicable, a threshold value for a compensation amount during a given time period, an employee exemption status, or date information for which the one or more compliance rules are applicable, and generating, by the computing system, the one or more compliance rules parameterized for the first jurisdiction object based at least in part on the one or more inputs.

According to one or more example embodiments, one or more tangible non-transitory computer-readable media store computer-readable instructions that when executed by one or more processors cause the one or more processors to perform operations, the operations including: accessing, by a computing system, employee information from organizational data stored in one or more databases, the employee information being associated with a first employee object from a plurality of employee objects which are stored in the one or more databases, accessing, from the organizational data, jurisdictional information associated with a first jurisdiction object from a plurality of jurisdiction objects which are stored in the one or more databases, importing one or more compliance parameters relating to the first jurisdiction object to generate one or more compliance rules parameterized for the first jurisdiction object, determining compliance with the one or more compliance rules parameterized for the first jurisdiction object with respect to the first employee object, based on the employee information and the one or compliance parameters, and based on the determining, providing an output indicating whether the one or more compliance rules parameterized for the first jurisdiction object are being complied with, with respect to the first employee object.

In some implementations, the importing and the determining are triggered by and performed in response to at least one of a change in the employee information associated with the first employee object or a change in the one or more compliance rules parameterized for the first jurisdiction object.

Other aspects of the disclosure are directed to various systems, apparatuses, non-transitory computer-readable media, user interfaces, and devices for providing triggers in a system of record. These and other features, aspects, and advantages of various embodiments of the disclosure will become better understood with reference to the following description and appended claims. The accompanying drawings, which are incorporated in and constitute a part of this specification, illustrate example embodiments of the disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended drawings, in which:

FIG. 4 depicts a flow diagram of an example method for determining compliance with one or more compliance rules in a compliance evaluation system, according to example embodiments of the disclosure.

FIGS. 6A-6C depict example user interfaces for a user to input compliance information for a jurisdiction in association with a compliance evaluation system, according to example embodiments of the disclosure.

FIGS. 7A-7B depict example user interfaces which display outputs indicating whether one or more compliance rules parameterized for a jurisdiction object are being complied with, according to example embodiments of the disclosure.

DETAILED DESCRIPTION

Figure 1:
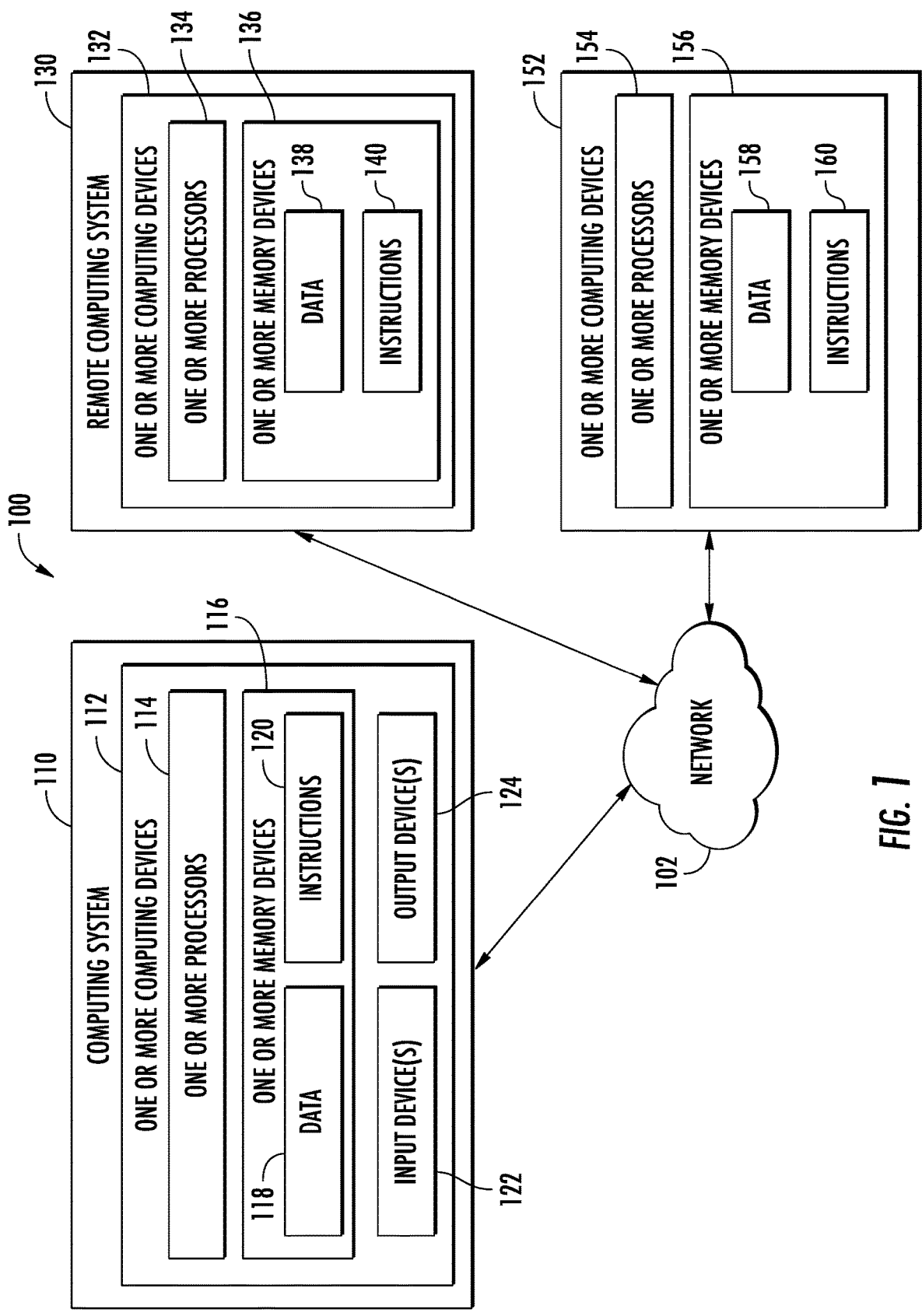
FIG. 1 depicts a block diagram of an example environment including a computing system that performs operations, according to example embodiments of the disclosure.

Reference now will be made to embodiments of the disclosure, one or more examples of which are illustrated in the drawings, wherein like reference characters denote like elements. Each example is provided by way of explanation of the disclosure and is not intended to limit the disclosure. In fact, it will be apparent to those skilled in the art that various modifications and variations can be made to disclosure without departing from the scope or spirit of the disclosure. For instance, features illustrated or described as part of one embodiment can be used with another embodiment to yield a still further embodiment. Thus, it is intended that the disclosure covers such modifications and variations as come within the scope of the appended claims and their equivalents.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

Generally, the disclosure is directed to improved computer systems, computer applications, computer-implemented methods, user interfaces, and/or services for a compliance evaluation system (compliance engine) which configures parametrized compliance rules in order to manage and evaluate compliance for an organization and/or employee with respect to applicable ordinances, rules, regulations, laws, and the like related to one or more jurisdictions associated with the organization and/or employee. In response to determining whether an employee and/or organization is compliant with a given compliance rule, various outputs may be provided and various actions may be performed.

In some implementations, the various outputs and actions can include a compliance report being generated and presented to a user, the compliance report indicating a compliance status for individual employees of the organization. In some implementations, when an employee is determined to not be in compliance with one or more compliance rules, an alert and/or notification may be generated and transmitted to one or more of the employee, a manager of the employee, a human resources officer, a compliance officer, and the like. In some implementations, when an employee is determined to not be in compliance with one or more compliance rules, the employee may be prevented from accessing certain organizational resources (e.g., prevented from clocking-in, prevented from accessing a vehicle belonging to the organization, prevented from accessing a computing device belonging to the organization, prevented from accessing supplies belonging to the organization, etc.). In some implementations, when the employee is determined to be in compliance with one or more compliance rules after not being in compliance with the one or more compliance rules (e.g., corrective action has been taken such as renewing a license, completing required training courses, taking required time-off before returning to work, etc.), access to the organizational resources may be restored to the employee.

In some implementations, when an organization is determined to not be in compliance with one or more compliance rules with respect to an employee, an alert and/or notification may be generated and transmitted to one or more of the employee, a manager of the employee, a human resources officer, a compliance officer, and the like. In some implementations, when the organization is determined to not be in compliance with one or more compliance rules with respect to an employee, the organization may be prevented from performing certain operations. For example, if the organization is determined to not be in compliance with an overtime rule with respect to an employee, the organization may be prevented from scheduling the employee for work until the organization is once again compliant (e.g., after a number of hours the employee is scheduled to work in a given time period is below a threshold value). For example, if the organization is determined to not be in compliance with a sick leave policy rule with respect to an employee, the organization may be prevented from scheduling the employee for work until the organization is once again compliant (e.g., by assigning a sick leave policy to the employee).

In some implementations, when the compliance evaluation system determines an organization and/or employee is not compliant with one or more compliance rules, one or more recommendations for resolving the infraction may be presented to a user of the compliance evaluation system. In some implementations, when an infraction is identified (i.e., when the organization and/or employee is determined to not be compliant with one or more compliance rules of a particular jurisdiction with respect to the employee), the compliance evaluation system may determine or identify one or more reasons for the non-compliance and provide the one or more reasons for the non-compliance to a user of the compliance evaluation system.

In some implementations, compliance evaluations can be automatically generated based on a trigger. For example, the activation of the trigger can be based on the change of an employee status (e.g., birth of a child, suffering a disability, an employee taking sick leave, an employee taking vacation leave, an employee being terminated, an employee being hired, an employee being promoted, an employee changing positions within the organization, an employee being scheduled for overtime, an employee exemption status changing, etc.), which can result in different outcomes with respect to different compliance rules. For example, when an employee changes from an exempt employee to a non-exempt employee, different minimum wage laws may apply, and thus the compliance evaluation system may re-evaluate whether the organization remains compliant with minimum wage laws which apply in the jurisdiction applicable to the employee. For example, when an employee takes sick leave or vacation leave by providing an input to an organizational computing system, the compliance evaluation system may be triggered to evaluate whether the organization is compliant with respect to sick leave or vacation leave policies which apply in the jurisdiction applicable to the employee.

In some implementations, the compliance evaluation system may be triggered to evaluate compliance for an organization and/or employee with respect to applicable ordinances, rules, regulations, laws, and the like related to one or more jurisdictions associated with the organization and/or employee, according to a preset or predetermined schedule (e.g., every day, every week, etc.). In some implementations, one or more compliance rules for an organization in a particular jurisdiction may be evaluated in response to an input received from a user, so that the organization is able to determine whether the employee and/or organization is compliant with a particular rule at any point in time.

In some implementations, one or more compliance rules for an organization in a particular jurisdiction may be evaluated according to a particular role of an employee within the organization. For example, one or more compliance rules for an organization in a particular jurisdiction may be evaluated for all exempt employees within the organization or for all non-exempt employees within the organization.

In some implementations, a history of the evaluation of compliance rules may be stored in a database to allow historical tracking of compliance for the organization. For example, compliance may be tracked with respect to a particular compliance rule, with respect to a particular jurisdiction, with respect to a particular organization, and/or with respect to a particular employee.

In some implementations, the updating, deletion, or addition of compliance rules, compliance parameters, and reactionary measures (e.g., alerts, notifications, changes to access to organizational resources, time to take corrective action, etc.), may be made by a user of the compliance evaluation system (e.g., a manager of the organization, an administrator of the organization, etc.). For example, the user of the compliance evaluation may provide inputs through a user interface to update, delete, or add compliance rules, compliance parameters, and reactionary measures for particular jurisdiction. This allows for users to easily manage changing rules in different jurisdictions.

In some implementations, the compliance evaluation system may define compliance as a temporal property of an object of a class based on an evaluation of a set of rules. In some implementations, the rule may be evaluated according to a Boolean expression and have a true or false outcome (e.g., a minimum wage rule for a particular jurisdiction which has been complied with for a particular employee has a true outcome while a minimum wage rule for the particular jurisdiction which has not been complied with for the particular employee has a false outcome).

Aspects of the disclosure relate to encapsulating compliance rules for a real-world ordinance, rule, regulation, law, etc., as a list of conditions which can be composed of parameters and data objects. For example, the conditions may involve Boolean expressions operating on the parameters and data objects. For example, the conditions may be stored as an expression tree in a database and the parameters for applicable jurisdictions may be stored separately. With the compliance conditions stored as data, actual checks for compliance may be performed in a computer language (e.g., a high-level language (HLL)) by translating the conditions at run time to expressions in the HLL and substituting the data objects to be checked and the parameters for the applicable jurisdiction.

In some implementations, the expression tree supports operating on data objects through named functions. An expression may include an operator and list of operands based on the arity of the operator and can be of the following types: FUNCTION, PARAMETER, CONSTANT, EXPRESSION. Expression trees can be recursively extended provided the operator and the operands are validated and corresponding return types are recursively validated.

The runtime translation of the expression tree may also follows a recursive approach and optimize the executions as much as possible. As an example technical benefit or advantage, by storing the rule logic as an expression tree in a database, it is possible to change the rules without requiring a code change or a deployment with sufficient validations which allows for a rule builder that can manage rules as configs in a database and decouple a rule addition/change from code or the deployment. As another example technical benefit or advantage, the decoupling of rules from code and compliance parameters at a jurisdictional level makes it possible for non-developers to edit or set rule definitions via config and set compliance parameters for a jurisdiction without changes to a codebase.

An example of a jurisdiction object, compliance parameters, and compliance rule is shown below:

```
Jurisdiction-USJurisdiction-CaliforniaStateJurisdiction
Compliance-MinWageCompliance (conditions = [{
operator: GT, operator_type: relational, operands:[0: {type: data, value:
dailyWage}, 1: {type: parameter, value: dailyWageThreshold}]
}]
JurisdictionalCompliance-CaliforniaStateJurisdiction +
MinWageCompliance :
parameters = {dailyWageThreshold: 16}
```

In the above example, the jurisdiction object may be defined based on jurisdictional information including a country and a state (e.g., Jurisdiction—USJurisdiction—CaliforniaStateJurisdiction). In the example, a compliance rule may be defined according to a relational operator (greater than) and a plurality of operands which include compliance data and a compliance parameter (dailyWage and daily WageThreshold). Accordingly, the compliance rule is subsequently defined based on the defined jurisdiction object of California and compliance parameters imported to a compliance object where the minimum wage rule is associated with the jurisdiction object of California and is conditioned on whether the daily wage of the employee (e.g., in terms of an hourly wage) is greater than $16, which corresponds to the compliance parameter value set for the parameter dailyWageThreshold.

In some implementations, users are able to define jurisdictions, parameterize compliance rules, and map the compliance rules to jurisdictions by providing the values of the parameters to define the jurisdiction level compliance rules.

For example, adding a new type of compliance rule includes creating a policy specific compliance class deriving from a base compliance model, defining the parameters along with their types and validations, and implementing the compliance method with the logic that involve evaluating company/role level objects with the values set up in the parameters.

For example, adding a compliance rule to a jurisdiction includes creating a compliance object with corresponding compliance rules for the jurisdiction and defining the parameters applicable to the jurisdiction.

For example, when adding a jurisdiction (such as a country) extensions for the jurisdiction may also be defined (e.g., city, county, state, postal code in the United States and county, district, parish in the United Kingdom). Jurisdiction objects may be created which correspond to the jurisdiction and extensions of the jurisdiction.

The compliance evaluation system may be programmed so that compliance objects specific to a particular jurisdiction are not able to be linked to another jurisdiction (e.g., a compliance object specific to the United Kingdom is prevented from being linked to a jurisdiction object that is in the United States), so as to prevent errors in generating a compliance rule.

In some implementations, generic rules may be applied across a plurality of jurisdictions (e.g., across a plurality of states, or a plurality of countries). While a generic rule may be applied across a plurality of jurisdictions, parameters for the rule can be changed for each jurisdiction. For example, a generic minimum wage rule may be defined according to a greater than operator which compares a wage of an employee with a minimum wage threshold parameter value. Here, while the rule may be generic to multiple jurisdictions, the specific minimum wage threshold parameter value can be changeable according to the jurisdiction.

According to example embodiments disclosed herein, a compliance evaluation system can be utilized by an organization to improve the effectiveness and case with which employers, managers, executives, and the like can verify or ensure compliance of an employee and/or organization with ordinances, rules, regulations, laws, etc. which are applicable to the organization and/or employees of the organization and may result in an improvement in the overall effectiveness of operations across the organization (e.g., by saving time), reduce errors (e.g., by avoiding human mistakes in monitoring compliance), reduce costs (e.g., by avoiding fines due to infractions as well as the labor-intensive costs of monitoring and evaluating compliance), improve safety (e.g., by ensuring compliance with applicable licensing rules or preventing employees from working or accessing organizational resources who are not in compliance), etc. Similarly, improving the speed, effectiveness, and case with which employers, managers, executives, and the like can be made aware of compliance infractions and take appropriate corrective measures may result in an improvement in the overall effectiveness of operations across the organization, reduce errors, reduce costs, improve safety, etc.

Additionally, using the techniques described herein, a technical benefit or advantage is obtained by the compliance evaluation system, particularly with respect to computing databases which are structured so that compliance rules are changeable (e.g., through the importation of parameters for a jurisdiction for a particular compliance rule) without requiring a code change to a codebase. Accordingly, the compliance rules are decoupled from the code and parameters can be set at respective jurisdictional levels.

In some implementations, at least some of the data inputted into the compliance evaluation system can be obtained or derived from other third-party applications that the organization is associated with. For example, ordinances, rules, regulations, laws, etc. that are applicable to various organizations and employees may be obtained from other third-party application and can be used or referenced by users of the compliance evaluation system to formulate or generate a compliance rule. In addition, the organization and users of the compliance evaluation system may be able to ensure that ordinances, rules, regulations, laws, etc. which are applied during a compliance evaluation are up to date and current.

According to example embodiments disclosed herein, the compliance evaluation system can automate certain employment-related HR administrative duties, including HR compliance operations. With regards to HR compliance, the compliance evaluation system can assist organizations to be compliant with labor and employment ordinances, rules, regulations, laws, etc. The ordinances, rules, regulations, laws, etc. can be complicated, different in every jurisdiction, and often changing. The compliance evaluation system assists organizations to follow the applicable compliance rules and avoid costly fines, lawsuits, improve employee morale, improve workplace safety, etc. The compliance evaluation system brings technology, HR expertise, and established processes that allows organizations to save time on administrative functions and stay compliant.

The compliance evaluation system described herein saves time by automating certain HR administrative duties. The compliance evaluation system can assist with general employee management. With regards to general employee management, the compliance evaluation system can ensure internal processes are followed as well as ensure compliance with applicable ordinances, rules, regulations, laws, etc. (e.g., ensure vacation leave, sick leave, parental leave, overtime, and other policies and rules are followed, and limit or prevent access to organizational resources which should be restricted due to an infraction).

The compliance evaluation system can also enable organizations to hire remotely and ensure compliance with local, state, and country specific ordinances, rules, regulations, laws, etc. which are applicable to a remotely located employee.

With reference to the drawings, example embodiments of the disclosure will be discussed in further detail.

FIG. 1 depicts a block diagram of an example environment 100 including a computing system 110 that performs operations according to example embodiments of the disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 may include a local area network (LAN), wireless local area network (WLAN), wide area network (WAN), personal area network (PAN), virtual private network (VPN), an intranet, an extranet, and the like. For example, wireless communication between elements of the example embodiments may be performed via a wireless LAN, Wi-Fi, Bluetooth, ZigBee, Wi-Fi direct (WFD), ultra wideband (UWB), infrared data association (IrDA), Bluetooth low energy (BLE), near field communication (NFC), a radio frequency (RF) signal, and the like. Further, the network 102 can include any number of wired or wireless connections and/or links that can be used to communicate with one or more computing systems (e.g., the computing system 110 and/or the remote computing system 130) and/or one or more devices (e.g., the one or more computing devices 152). For example, wired communication between elements of the example embodiments may be performed via a pair cable, a coaxial cable, an optical fiber cable, an Ethernet cable, and the like. Communication over the network 102 can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems (not shown) and/or one or more computing devices 112. Further, the computing system 110 may be connected (e.g., networked) to one or more computing systems (e.g., remote computing system 130) and/or one or more computing devices (e.g., one or more computing devices 132, 152) via the network 102. The computing system 110 may operate in various configurations including as a server or a client machine in a client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes one or more computing devices 112. The one or more computing devices 112 can include any type of computing device. For example, the one or more computing devices 112 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can include any processing device (e.g., a processor core, a microprocessor, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a controller, or a microcontroller) and can include one processor or multiple processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/ or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random-access memory (RAM), read-only memory (ROM), EEPROM, EPROM, one or more flash memory devices, and/or one or more magnetic storage devices (e.g., one or more hard disk drives, floppy disks, a blue-ray disk, or optical media such as CD ROM discs and DVDs, or combinations thereof).

The one or more processors 114 can be configured to execute one or more instructions to perform the operations described herein. Further, the one or more memory devices 116 can store the data 118 and/or the instructions 120, which can be executed by the one or more processors 114 to cause the one or more computing devices 112 to perform one or more operations. For example, the one or more operations performed by the one or more processors 114 can include obtaining or accessing organizational data associated with a first organization of the plurality of organizations, the organizational data including employee information of an employee of the organization and jurisdictional information associated with a particular jurisdiction associated with the employee. For example, the one or more operations performed by the one or more processors 114 can further include receiving or importing compliance parameters to formulate or generate a compliance rule which is parameterized for the particular jurisdiction. For example, the one or more operations performed by the one or more processors 114 can further include evaluating or determining compliance with the compliance rule parameterized for the particular jurisdiction with respect to the employee, based on the employee information and the compliance parameters. For example, the one or more operations performed by the one or more processors 114 can further include providing an output indicating whether the one or more compliance rules parameterized for the first jurisdiction object are being complied with, with respect to the employee.

The data 118 can include organizational data (e.g., organizational data that can include one or more organizational records), one or more data structures defining, describing, and/or otherwise associated with the organizational data, rule data (e.g., rule data that includes one or more rules used to configure an application policy, one or more rules maintained by or otherwise associated with an organizational data management system, etc.), application data (e.g., application data associated with a plurality of applications including one or more third-party applications and/or one or more intra-organizational applications), third-party integration data (e.g., data providing configuration and/or other information for performing integration and synchronization with each of one or more different third-party systems and/or applications), employee data, compliance data, jurisdiction data, data that includes instructions in a custom computer language (e.g., a custom query language based on organizational data), data that includes rules associated with the custom computer language, and/or other types of data. Further, the instructions 120 can include one or more instructions to use data including the data 118 to perform any one or more of the various operations described herein. In some embodiments, the one or more memory devices 116 can be used to store one or more applications that can be operated by the one or more processors 114. The data 118, the instructions 120, and/or the one or more applications can be associated with an organization. Further, the computing system 110 may be associated with an organization and may be configured to manage one or more applications.

Any of the one or more computing devices 112 can include one or more input devices 122 and/or one or more output devices 124. The one or more input devices 122 can be configured to receive input (e.g., user input) and can include one or more touch screens, one or more keyboards (e.g., a physical keyboard, virtual keyboard, etc.), one or more mouse devices, one or more joysticks, one or more buttons, one or more switches, one or more electronic pens or styluses, one or more gesture recognition sensors (e.g., to recognize gestures of a user including movements of a body part), one or more input sound devices or voice recognition sensors (e.g., a microphone to receive a voice command), one or more track balls, one or more remote controllers, one or more portable (e.g., a cellular or smart) phones, one or more pedals or footswitches, one or more virtual-reality devices, one or more cameras, and combinations thereof. The one or more output devices 124 can include one or more display devices, one or more loudspeaker devices, one or more haptic output devices, and combinations thereof. By way of example, the one or more output devices 124 can be used to display a graphical user interface via a display device that can include a touch screen layer that is configured to detect one or more inputs (e.g., one or more user inputs). The one or more processors 114 may perform one or more operations based at least in part on the one or more inputs.

The remote computing system 130 includes one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102. In some embodiments, the remote computing system 130 can include one or more applications (e.g., computer software applications comprising computer instructions) that can be stored and/or executed by the remote computing system 130.

One or more computing devices 152 (e.g., user devices or any other types of devices) can include one or more processors 154, one or more memory devices 156, the data 158, and/or the instructions 160. Such one or more computing devices 152 may include any of the attributes and/or capabilities of the one or more computing devices 112, 132. Further, such one or more computing devices 152 can communicate with one or more devices and/or one or more systems via the network 102. In some embodiments, the one or more computing devices 152 can include one or more applications (e.g., computer software applications comprising computer instructions) that can be stored and/or executed by such one or more computing devices 152.

Figure 2:
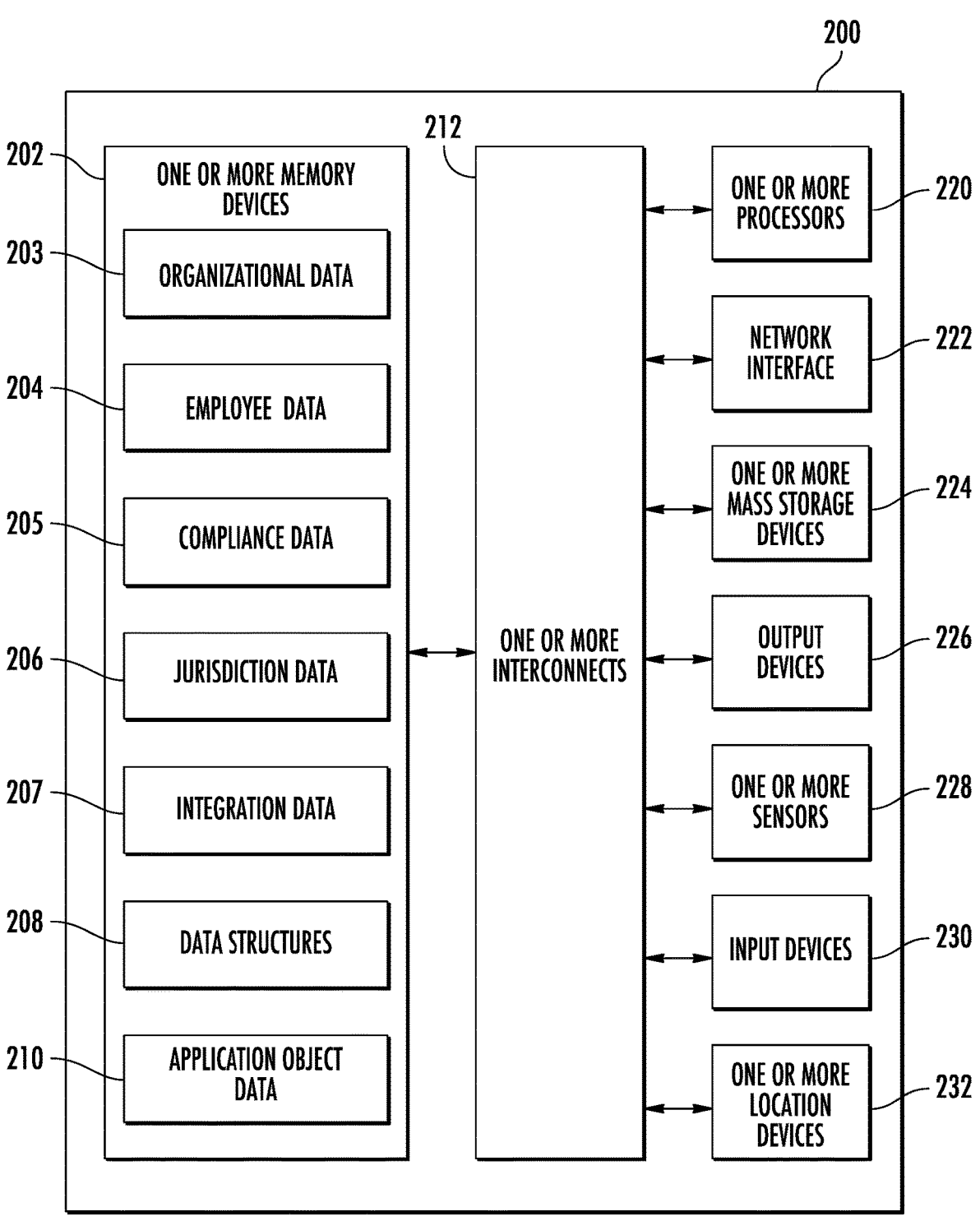
FIG. 2 depicts a block diagram of an example of a computing device, according to example embodiments of the disclosure.

FIG. 2 depicts a block diagram of an example computing device 200 according to example embodiments of the disclosure. The computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 203, employee data 204, compliance data 205, jurisdiction data 206, integration data 207, data structures 208, application object data 210, one or more interconnects 212, one or more processors 220, a network interface 222, one or more mass storage devices 224, one or more output devices 226, one or more sensors 228, one or more input devices 230, and/or one or more location devices 232.

The one or more memory devices 202 can store information and/or data (e.g., organizational data 203, employee data 204, compliance data 205, jurisdiction data 206, integration data 207, data structures 208, application object data 210, and/or any other types of data). Further, the one or more memory devices 202 can include one or more non-transitory computer-readable storage media, including RAM, ROM, EEPROM, EPROM, flash memory devices, magnetic disks, and any combination thereof. The information and/or data stored by the one or more memory devices 202 can be executed by the one or more processors 220 to cause the computing device 200 to perform one or more operations described herein.

The organizational data 203 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. The organizational data 203 also can include information associated with one or more applications (e.g., one or more third-party applications), one or more organizational records and/or one or more organizational policies. In some embodiments, the organizational data 203 can be received from one or more computing systems (e.g., the remote computing system 130 depicted in FIG. 1) which can include one or more computing systems that are remote (e.g., in another room, building, part of town, city, or nation) from the computing device 200. In some instances, the organizational data 203 can include the employee data 204, the compliance data 205, the jurisdiction data 206, the integration data 207, the data structures 208, and the application object data 210.

The employee data 204 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The employee data 204 can include employee records and information about their dependents. The employee data 204 can include any information that may be useful or needed to determine whether the organization and/or employee is compliant with any particular ordinances, regulations, rules, laws, etc. pertaining to a jurisdiction in which the employee is employed or may be employed or perform work in. For example, the employee data 204 can include age information of the employee, licenses and/or certifications held by the employee, accommodations needed for the employee, current and past job information (e.g., job titles, positions held, etc.), experience information (e.g., duration of employment at the organization), whether the employee is exempt or non-exempt (e.g., as determined according to government regulations and/or laws such as the Fair Labor Standards Act), scheduling information, pay information, leave information (e.g., vacation leave, sick leave, maternity/paternity leave, etc.), benefits information, and the like. In some instances, the employee data 204 can be collected in real-time and uploaded to the computing system 110 or retrieved by the computing system periodically (e.g., every five minutes, every fifteen minutes, etc.). In some instances, the employee data 204 can be collected by a manual input from a user (e.g., in response to a change in the employee status such as a promotion or termination of the employee). In some embodiments, the employee data 204 can be received from one or more computing systems (e.g., the remote computing system 130 depicted in FIG. 1) which can include one or more computing systems that are remote from the computing device 200.

The compliance data 205 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The compliance data 205 can include different compliance data for various jurisdictions (e.g., compliance data for cities, counties, parishes, states, provinces, countries, etc.). The compliance data 205 can include different compliance data for various areas of compliance (e.g., compliance with sick leave requirements for a particular jurisdiction, compliance with vacation leave requirements for a particular jurisdiction, compliance with family leave requirements for a particular jurisdiction, compliance with licensing requirements for a particular jurisdiction, compliance with overtime requirements for a particular jurisdiction, compliance with termination pay requirements for a particular jurisdiction, etc.). The compliance data 205 can include ordinances, regulations, rules, laws, etc. which relate to various requirements concerning the employment of employees by the organization. The compliance data 205 can include any information that may be useful or needed to determine whether the organization and/or employee is compliant with any particular ordinance, regulation, rule law, etc., pertaining to a particular jurisdiction. For example, the compliance data 205 can include any information that is relevant to a particular rule the employer and/or employee may be required to comply with (e.g., a minimum employer size, a maximum employer size, a minimum employer size in the jurisdiction, a maximum employer size in the jurisdiction, a minimum wage, whether an exemption status is applicable, dates for which the rule is applicable, age requirements for a particular job role, licensing requirements for a particular job role, salary requirements for a particular job role, etc.). In some instances, the compliance data 205 can include a compliance object which contains the compliance rule and/or conditions for the compliance rule. In some instances, the compliance data 205 can be collected in real-time and uploaded to the computing system 110 or retrieved by the computing system periodically (e.g., every five minutes, every fifteen minutes, etc.). In some instances, the compliance data 205 can be collected by a manual input from a user (e.g., in response to a change in a change in a regulation or law for a particular jurisdiction). In some embodiments, the compliance data 205 can be received from one or more computing systems (e.g., the remote computing system 130 depicted in FIG. 1) which can include one or more computing systems that are remote from the computing device 200.

The jurisdiction data 206 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Additionally, the jurisdiction data 206 may include information associated with jurisdictions in which the organization and/or employees of the organization operate or may operate. The jurisdiction data 206 can include jurisdiction information for one or more jurisdiction and may include a jurisdiction name, a jurisdiction type (e.g., one or more of a zip code, a city, a county, a state, a country, etc.), and any other information which may be used to identify the jurisdiction. The jurisdiction data 206 may be associated with the compliance data 205, for example. For example, compliance data 205 may be mapped to a particular jurisdiction from the jurisdiction data 206, or vice versa. In some instances, the jurisdiction data 206 can be collected in real-time and uploaded to the computing system 110 or retrieved by the computing system periodically (e.g., every five minutes, every fifteen minutes, etc.). In some instances, the jurisdiction data 206 can be collected by a manual input from a user (e.g., in response to the creation or deletion of a jurisdiction, for example due to a city being incorporated, due to borders being redrawn, etc.). In some embodiments, the jurisdiction data 206 can be received from one or more computing systems (e.g., the remote computing system 130 depicted in FIG. 1) which can include one or more computing systems that are remote from the computing device 200.

The integration data 207 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The integration data 207 can include configuration and/or operational information associated with integrating and synchronizing data (e.g., organizational data 203) among one or more applications or organizations. For example, the integration data 207 can include information that enables integration and synchronization between each of one or more organizations (e.g., small size businesses). In an embodiment, the integration data 207 provides integration information that allows an organizational data management system (e.g., a system of record for organizational data and organizational data processing), for example, to obtain information from one or more organizations or applications (e.g., third party and/or other applications), to perform operations involving organizational data (e.g., organizational data 203) in the organizational data management system, to synchronize organizational data across one or more organizations or applications, to perform one or more actions involving the organizations or applications based on organizational data in the organizational data management system, and/or to perform one or more other operations associated with managing organizational data as a system of record. In some embodiments, the integration data 207 can be received from one or more computing systems (e.g., the remote computing system 130 depicted in FIG. 1), which can include one or more computing systems that are remote from the computing device 200.

The data structures 208 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The data structures 208 can include one or more logical and/or physical instances of information representing or describing one or more entities (e.g., objects, records, etc.), one or more relationships involving one or more of the entities, one or more data values associated with each of one or more of the entities and/or one or more of the relationships, one or more functions and/or operations that may be applied to each of one or more of the entities and/or one or more of the relationships, any other data or metadata describing or otherwise defining structure and/or rules associated with one or more of the entities and/or one or more of the relationships, etc.

The data structures 208 can be implemented and utilized with one or more types of computer software, computer hardware, or any combination thereof. In an embodiment, the data structures 208 are used to represent and perform processing associated with various types of organizational data (e.g., organizational data 203). For example, the data structures 208 may include information about various types of information and entities associated with organizational data including, but not limited to, individuals (e.g., employees, vendors, independent contractors), departments, teams, roles, groups, locations, offices, documents, tasks, reports, accounts, devices, applications, end-user applications, licenses, workflows, alerts, time information, attendance information and/or any other types of entities representing or related to managing organizational data (e.g., organizational data 203).

The data structures 208 also can define various relationships among the various entities associated with organizational data 203. For example, the data structures 208 may define and be used to enforce relationships such as each employee must be assigned to a department, each employee can be included on one or more teams, each employee must be assigned to a primary location, each employee may be assigned to one or more secondary locations, employees may have access to or be assigned one or more computing devices, each vendor must have a current audit, each independent contractor must be associated with a contract, and/or any other relationships provided by an organizational data management system or configured for an organization that utilizes an organizational data management system (e.g., a system for managing organizational data 203 based on one or more organizational data management applications).

In some embodiments, the data structures 208 can include one or more object graphs (e.g., based on an object graph data model) providing information about entities, relationships, and/or any other aspects relating to the definition, structure, and rules associated with organizational data (e.g., organizational data 203). The data structures 208 also can include any one or more other types of data structures (e.g., with or without the use of object graphs) that provide information about entities, entity attributes, entity attribute categories, relationships, and/or any other aspects of the definition, structure, and/or rules associated with organizational data. In some embodiments, the data structures 208 can be received from one or more computing systems (e.g., the remote computing system 130 depicted in FIG. 1), which can include one or more computing systems that are remote from the computing device 200.

In some instances, the organizational data 203 can include the data structures 208. In some instances, the employee data 204 can include the data structures 208 of an organization.

The application object data 210 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the application object data 210 generally can include any information used to implement any particular type of application object or associated data structure that stores, references, utilizes, and/or processes data (e.g., organizational data 203). For example, such types of application objects generally may include, but are not limited to, application triggers, actions performed based on a trigger, reports, workflows, tasks, custom application objects, and/or any other types of objects used to store and/or process data in a system of record, such as an organizational data management system. Further, application object data 210 may be used to implement any particular type of application object or associated data structure and may include, but is not limited to, instructions in a computer language (e.g., a custom computer language provided by an organizational data management system for managing organizational data 203), metadata associated with application objects or related data structures, data associated with one or more particular instances of application objects or related data structures, data associated with the configuration of one or more application objects or related data structures, etc. In some embodiments, the application object data 210 can be received from one or more computing systems (e.g., the remote computing system 130 depicted in FIG. 1) which can include one or more computing systems that are remote from the computing device 200.

The one or more interconnects 212 can include one or more interconnects or buses that can be used to send and/or receive one or more signals (e.g., electronic signals) and/or data (e.g., organizational data 203, employee data 204, compliance data 205, jurisdiction data 206, integration data 207, data structures 208, application object data 210, and/or any other data) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the one or more location devices 232. The one or more interconnects 212 can be arranged or configured in different ways. For example, the one or more interconnects 212 can be configured as parallel or serial connections. Further the one or more interconnects 212 can include one or more internal buses that are used to connect the internal components of the computing device 200 and one or more external buses used to connect the internal components of the computing device 200 to one or more external devices. By way of example, the one or more interconnects 212 can include different interfaces including Industry Standard Architecture (ISA), Extended ISA, Peripheral Components Interconnect (PCI), PCI Express, Serial AT Attachment (SATA), Hyper-Transport (HT), USB (Universal Serial Bus), Thunderbolt, IEEE 1394 interface (Fire Wire), and/or other interfaces that can be used to connect components.

The one or more processors 220 can include one or more computer processors that are configured to execute the one or more instructions stored in the one or more memory devices 202. For example, the one or more processors 220 can, for example, can include any processing device (e.g., a processor core, a microprocessor, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a controller, or a microcontroller) and can include one processor or multiple processors that may be operatively connected. Further, the one or more processors 220 can perform one or more actions and/or operations including one or more actions and/or operations associated with the organizational data 203, the employee data 204, the compliance data 205, the jurisdiction data 206, the integration data 207, the data structures 208, the application object data 210, and/or any other data. The one or more processors 220 can include single or multiple core devices.

The network interface 222 can support network communications. The network interface 222 can support communication via wired and/or wireless networks including a local area network (LAN), wireless local area network (WLAN), wide area network (WAN), personal area network (PAN), virtual private network (VPN), an intranet, an extranet, and the like. For example, the network interface 222 can allow the computing device 200 to communicate with the computing system 110 via the network 102.

The one or more mass storage devices 224 (e.g., a hard disk drive and/or a solid-state drive) can be used to store data including the organizational data 203, the employee data 204, the compliance data 205, the jurisdiction data 206, the integration data 207, the data structures 208, the application object data 210, and/or any other data. The one or more output devices 226 can include one or more display devices (e.g., a liquid crystal display (LCD), a light emitting diode (LED) display, an organic light emitting diode (OLED) display, active matrix organic light emitting diode (AMO-LED), flexible display, 3D display, a plasma display panel (PDP), a cathode ray tube (CRT) display, and the like), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. The one or more sensors 228 may also include one or more sensors to detect or recognize environmental information (for example, a temperature sensor to detect or recognize temperature, a pressure sensor to detect or recognize pressure, a humidity sensor to detect or recognize humidity, etc.). The one or more sensors 228 may also include a force and/or torque sensor to detect or recognize a force and/or torque. The one or more sensors 228 may further include an audio sensor (e.g., a microphone) to recognize a voice of one or more users that can be used as part of verifying an identify of a user and/or for invoking or performing one or more operations. Further, the one or more sensors 228 can be used to provide input (e.g., an image of a user captured using the one or more cameras) that can be used as part of invoking or performing one or more operations. For example, the one or more sensors 228 can be used to authenticate the identity of a user and determine an authorization level based on an image of the user's face that is captured using the one or more sensors 228.

The one or more input devices 230 can include one or more touch sensitive devices (e.g., a touch screen display), one or more keyboards (e.g., a physical keyboard, virtual keyboard, etc.), one or more mouse devices, one or more joysticks, one or more buttons (e.g., ON/OFF buttons and/or YES/NO buttons), one or more switches, one or more electronic pens or styluses, one or more gesture recognition sensors (e.g., to recognize gestures of a user including movements of a body part), one or more input sound devices or voice recognition sensors (e.g., a microphone to receive a voice command), one or more track balls, one or more remote controllers, one or more portable (e.g., a cellular or smart) phones, one or more pedals or footswitches, one or more virtual-reality devices, one or more cameras (e.g., cameras that are used to detect gestures that can trigger one or more operations by the computing device 200), and combinations thereof. Further, the one or more input devices 230 can be used to provide inputs relating to a rule associated with a trigger that is received from a user input of a user), inputs relating to employee information associated with employee data 204, inputs relating to compliance parameters associated with compliance data 205, inputs relating to jurisdiction information associated with jurisdiction data 206, and other inputs that can be used as part of invoking or performing one or more operations. For example, the one or more input devices 230 can be used to define a compliance rule for a particular jurisdiction by inputting parameters and/or properties associated with compliance data 205. For example, one or more minimum wage rules for the jurisdiction of King County in Washington may be defined as being applicable to organizations of a certain employee size (more or less than 500 employees), based on whether the employee receives tips and/or healthcare benefits, based on a current year, based on the age of the employee, based on an exempt status, etc. For example, the rule may be associated with a trigger for the computing system 110 to perform an action based on the activation of the trigger. For example, the minimum wage rule for a particular employee may be determined to be violated based on the employee data associated with the particular employee in view of the defined compliance rule (e.g., the employee data indicates the particular employee is being paid less than the minimum wage and is not exempt from the minimum wage rule). In response to the computer device 200 determining the minimum wage rule has been violated for the particular employee a trigger may be activated and an alert may be issued (e.g., a message may be transmitted to a manager of the particular employee notifying the manager of the infraction).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, and/or network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications (e.g., one or more organizational applications and/or one or more third-party applications) that are subject to one or more application policies or utilize third-party integration data that can be configured, generated, and/or implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The one or more location devices 232 can include one or more devices or circuitry for determining the position of the computing device 200. For example, the one or more location devices 232 can determine an actual and/or relative position of the computing device 200 by using a satellite navigation positioning system (e.g. a GPS system, a Galileo positioning system, the Global Navigation satellite system (GLONASS), the BeiDou Satellite Navigation and Positioning system, an inertial navigation system, a dead reckoning system, based on IP address, by using triangulation and/or proximity to cellular towers or Wi-Fi hotspots, and/or beacons.

Figure 3:
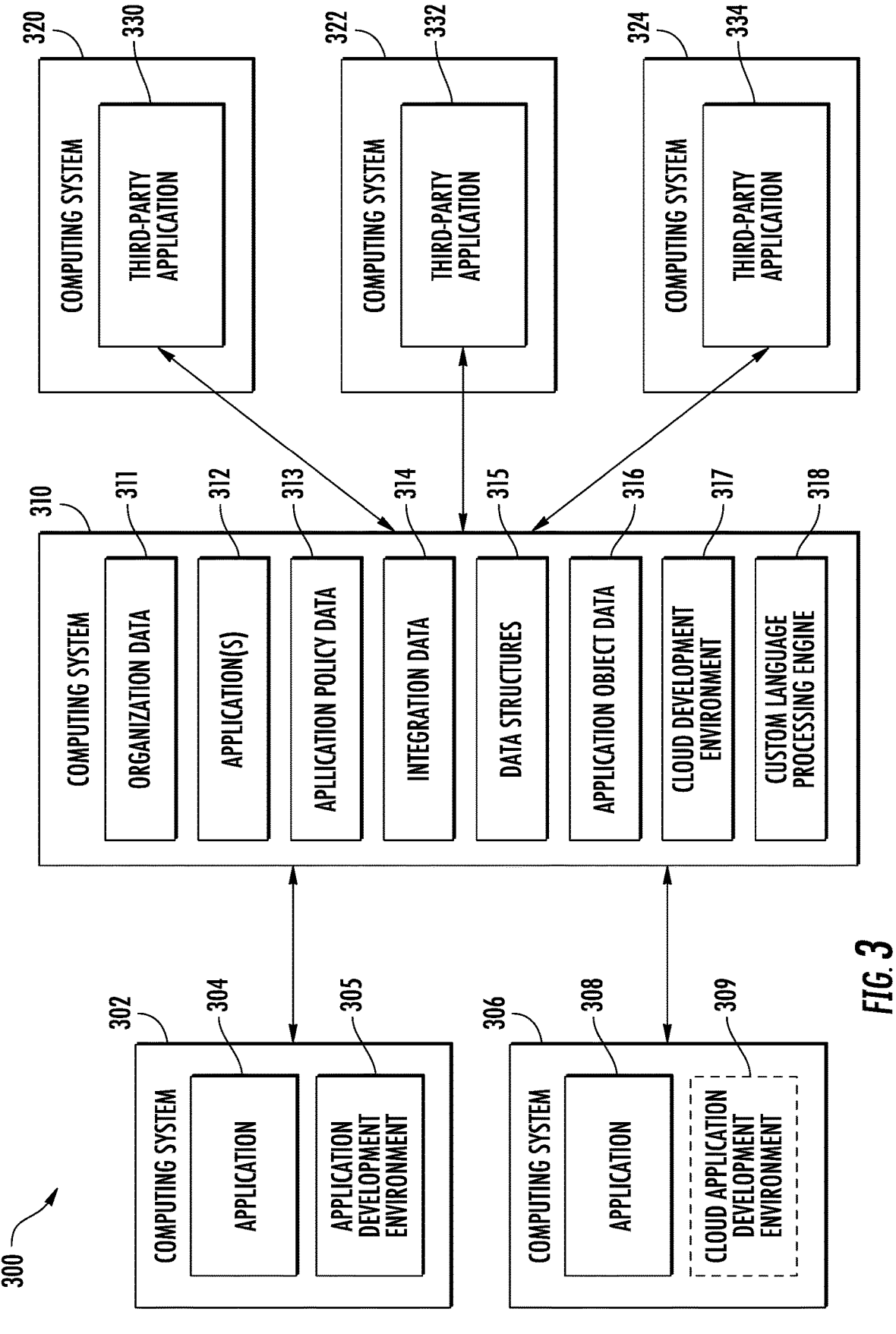
FIG. 3 depicts a block diagram of an example computing environment including multiple computing systems, according to example embodiments of the disclosure.

FIG. 3 depicts a block diagram of an example computing environment 300 including multiple computing systems, according to example embodiments of the disclosure. Any of computing system 302, computing system 306, computing system 310, computing system 320, computing system 322, or computing system 324 can include one or more attributes and/or capabilities of the computing system 110, the remote computing system 130, the one or more computing devices 152, and/or the computing device 200. Furthermore, any of the computing system 302, the computing system 306, the computing system 310, the computing system 320, the computing system 322, or the computing system 324 can be configured to perform one or more operations and/or one or more actions that can be performed by the computing system 110, the remote computing system 130, the one or more computing devices 152, and/or the computing device 200.

As shown in FIG. 3, the environment 300 includes the computing system 302, an application 304, an application development environment 305, the computing system 306, an application 308, a cloud application development environment 309, the computing system 310, organizational data 311 (e.g., organizational data 203), one or more application(s) 312, application policy data 313, integration data 314, data structures 315, application object data 316, cloud development environment 317, custom language processing engine 318, computing systems 320, 322, 324, and third-party applications 330, 332, 334.

In an embodiment, the computing system 302, the computing system 306, the computing system 310, the computing system 320, the computing system 322, and/or the computing system(s) 324 can be configured to communicate directly and/or via a communication network (e.g., the network 102 depicted in FIG. 1). In some instances, the computing system 302 can be associated with a first organization, the computing system 306 can be associated with a second organization, and the computing system 320 can be associated with a third organization, and so on. Each of the different organizations can be part of a professional employer organization (PEO) or may operate independently of a PEO.

In one embodiment, the computing system 302 includes an application 304 that is stored and/or operates on the computing system 302 and can communicate (e.g., send and/or receive data and/or information) with one or more other computing systems including the computing system 306 and/or the computing system 310. The application 304 can, for example, include an application that performs one or more operations on the computing system 302 associated with an organizational record that is stored as part of the organizational data 311. In an example, a user associated with any computing system 302, 306, 310 can use a portion of the organizational data 311 associated with their employee record to access a corresponding account associated with one or more of application 304, application 308, and/or application(s) 312.

In an embodiment, one or more application(s) 312 provide access to, utilize, support, and/or otherwise provide various interfaces or services that enable other applications (e.g., application 304, application development environment 305, application 308, cloud application development environment 309, application(s) 312) and/or users to perform various operations and activities involving one or more custom computer languages. For example, a custom computer language (e.g., a custom query language) generally may provide users with a simplified set of computer instructions that align with or match a user's understanding of a functional or business environment, such as an organization, business, industry, sector, etc. In some embodiments, each of one or more custom computer languages is a user language that allows users with a basic understanding of a subject, topic, business area, organization, functional role, industry, sector, etc. to implement custom computer instructions in terms that are familiar to the users, without knowledge of a complex computer programming language, without dependence on computer programmers, without being aware of or needing to know the complexity of underlying data organization and storage, without needing to understand, implement, and/or maintain a complex web of join conditions across various sets of underlying data, etc.

In an embodiment, a custom computer language generally enables users of any skill or level with a basic knowledge of a subject area to perform one or more operations or activities associated with an application (e.g., any of applications 312). For example, a custom computer language generally may enable a user to create, update, execute, and/or otherwise implement custom queries, reports, policies, workflows, triggers, and/or other functionality and operations associated with an application. In some embodiments, a custom computer language enables a user to utilize and perform various operations involving organizational data 311. For example, one or more applications associated with an organizational data management system or any other types of applications (e.g., applications 312) generally may provide a custom computer language allowing users to perform operations based on the structure and/or relationships associated with organizational data 311.

In an embodiment, a custom computer language may allow a user to use simplified terms to query organizational data 311. In one example, a custom computer language may allow a user to obtain the name of an employee's manager with the following example query: "ORG(John Smith, Manager)", which may return "Jane Jones" as the manager of the employee. As such, a custom computer language for an application may allow a user to use simplified and familiar terms without needing to understand complex interrelationships between various types of data stored across one or more different databases and/or other types of data stores. Further, a custom computer language generally may be processed by one or more applications (e.g., application(s) 312 associated with an organizational data store) so that users do not have to specify data joins when performing various operations involving organizational data 311.

In an embodiment, a custom computer language is based on and/or otherwise associated with one or more data structures 315 associated with an application. For example, a custom computer language may be based on, represent, describe, or otherwise be associated with an object graph data structure 315 (e.g., a master object graph, any one or more portions of a master object graph, etc.) and/or any other types of data structures 315 that describe the structure of an application and/or the underlying data associated with an application. In an example, a custom computer language is based on the structure of one or more applications and/or associated organizational data 311 of an organizational data management system. For example, the structure of the one or more applications and/or the associated organizational data 311 may be represented and described in one or more data structures 315 including, but not limited to, one or more independent and/or interrelated object graph data structures 315. In various embodiments, an application (e.g., one of application 312) and/or another supporting application used in association with the application can utilize object graph data structures 315 to process and perform various underlying operations associated with custom computer language instructions.

In an embodiment, the computing system 302 includes an application development environment 305 that provides users with access to and/or operations associated with one or more computer languages including, but not limited to, a custom computer language. For example, the application development environment 305 can be associated with one or more applications of an organizational data management system that stores and manages various types of organizational data 311. In an example, application development environment 305 generally may be an application (e.g., application 304) or portion of an application that enables a user to perform various operations involving organizational data 311 of an organizational data management system using a custom computer language. For example, application development environment 305 generally may enable a user to create, update, execute, and/or otherwise implement custom rules associated with triggers, actions performed based on an activation of a trigger, and/or other functionality and operations associated with one or more applications of an organizational data management system.

In various embodiments, one or more parts of the application development environment 305 may run, for example, on a computing system (e.g., computing system 302) and/or in association with information, applications, and/or services on another computing system (e.g., computing system 310). For example, application development environment

305 may utilize organizational data 311, application(s) 312, application policy data 313, integration data 314, data structures 315, and/or application object data 316 available from another computing system (e.g., computing system 310, one or more computing systems associated with an organizational data management system, etc.). Application development environment 305 also may include a query processing engine (not shown), computer instruction compiler (not shown), computer instruction generator (not shown), and/or other specialized computer software for performing operations associated with providing triggers in a system of record (e.g., based on computer instructions in a custom computer language provided by the system of record). Application development environment 305 also may utilize or work in conjunction with, in whole or in part, cloud development environment 317 and custom language processing engine 318 (including, for example any computer instruction compiler (not shown) and/or computer instruction generator (not shown) associated with custom language processing engine 318), and/or other features and or operations available from another computing system (e.g., computing system 310, one or more computing systems associated with an organizational data management system, etc.).

In an embodiment, application development environment 305 can include a user interface (e.g., an editor) that allows users to enter, define, edit, check, store, schedule, execute, and/or perform any other operations associated with creating, viewing, maintaining, and/or utilizing computer instructions in a custom computer language. In some embodiments, application development environment 305 includes a textual editor that enables users to enter and manipulate computing instructions in a custom computer language. In some examples, a textual editor of the application development environment 305 may assist users with constructing various types of statements in a custom computer language. For example, the textual editor may provide syntax highlighting in a custom computer language, intelligent completion of keywords or statements in a custom computer language, automated hints and examples, various types of pop-up information to assist a user in writing or editing instructions in a custom language, visual notification of syntax or other errors, suggested correction of syntax or other errors, automatic suggestion and/or population of objects and/or functions, etc. In some examples, automation and other assistance provided by a textual editor of the application development environment 305 may be based on and may actively utilize one or more data structures 315 (e.g., an object graph based on organizational data 311) associated with implementation of a custom computer language.

In an embodiment, the computing system 310 includes one or more application(s) 312 that can perform one or more operations on the computing system 310 and can communicate data and/or information with any one or more computing systems, including the computing system 302 and/or the computing system 306, or any one or more computing devices. The application(s) 312 can, for example, include an employee management application that operates on the computing system 310 and accesses the organizational data 311, which can include one or more organizational records associated with the names of organization employees and the respective employment status for each of the employees (e.g., an employee's position or role within the organization, an organizational department associated with the employee, etc.). A user (e.g., a privileged user, such as a manager or administrator with the authority to access and/or modify the organizational data 311) associated with the computing system 306 can, for example, access and/or modify the organizational data 311 to reflect changes to an employee's information (e.g., when an employee receives a promotion or a raise, leaves the organization, changes to a different department, is added to one or more new teams, is assigned new computer hardware or other equipment, obtains or renews a license, has a change in family status, etc.).

The one or more application(s) 312 can perform one or more operations on the computing system 310 and can communicate data and/or information with one or more computing systems, including the computing system 302 and/or the computing system 306, or any one or more computing devices. The application(s) 312 can, for example, include an administrative or other type of system application to manage one or more aspects of the application(s) 312 including, but not limited to, installing, configuring, maintaining, updating, integrating, automating and/or performing one or more other operations associated with the application(s) 312 on the computing system 310 and that can manage one or more aspects of one or more other applications on different systems and devices, which may include the application 304 and/or the application 308.

In some embodiments, the application(s) 312 can include one or more third-party applications that are stored and/or perform operations on the computing system 310. Further, the application(s) 312 can retrieve data and/or information associated with and/or operate in cooperation with applications external to the computing system 310 (e.g., the computing system 302 and/or the computing system 306). The application(s) 312 can also use (e.g., access, modify, and/or control) the organizational data 311. For example, the application(s) 312 can use the organizational data 311 that is associated with the application 304 to perform one or more operations using the application 308 that is on the computing system 306.

In an embodiment, the computing system 306 includes a cloud application development environment 309. For example, the cloud application development environment 309 generally may be a local instance of an online integrated development environment (e.g., a cloud development environment 317) provided by a computing system (e.g., computing system 310) that is accessed from a web browser and/or any other type of application 308 on another computing system (e.g., computing system 306). For example, the cloud application development environment 309 can be associated with one or more applications of an organizational data management system that stores and manages various types of organizational data 311. In an example, cloud application development environment 309 generally may be an application (e.g., application 308) or portion of an application that enables a user to perform various operations involving organizational data 311 of an organizational data management system using a custom computer language. For example, cloud application development environment 309 generally may enable a user to create, update, execute, and/or otherwise implement custom queries, reports, policies, workflows, triggers, rules, group assignments, and/or other functionality and operations associated with one or more applications of an organizational data management system. For example, cloud application development environment 309 may enable a user to create, update, execute, and/or otherwise implement custom queries, reports, policies, workflows, triggers, rules, group assignments, and/or other functionality and operations associated with compliance of an organization and/or an employee of the organization with respect to one or more jurisdictions.

In various embodiments, one or more parts of the cloud application development environment 309 may run, for example, on a computing system (e.g., computing system 306) and/or in association with information, applications, and/or services on another computing system (e.g., computing system 310). For example, cloud application development environment 309 may utilize organizational data 311, application(s) 312, application policy data 313, integration data 314, data structures 315 and/or application object data 316 available from another computing system (e.g., computing system 310, one or more computing systems associated with an organizational data management system, etc.). Cloud application development environment 309 also may include a query processing engine (not shown), computer instruction compiler (not shown), computer instruction generator (not shown), and/or other specialized computer software for performing operations associated with providing triggers in a system of record (e.g., based on computer instructions in a custom computer language provided by the system of record). Cloud application development environment 309 also may utilize or work in conjunction with, in whole or in part, cloud development environment 317 and custom language processing engine 318 (including, for example any computer instruction compiler (not shown) and/or computer instruction generator (not shown) associated with custom language processing engine 318), and/or other features and or operations available from another computing system (e.g., computing system 310, one or more computing systems associated with an organizational data management system, etc.).

In an embodiment, cloud application development environment 309 can include an editor that allows users to enter, define, edit, check, store, schedule, execute, and/or perform any other operations associated with creating, viewing, maintaining, and/or utilizing computer instructions in a custom computer language. In some embodiments, cloud application development environment 309 includes a textual editor that enables users to enter and manipulate computing instructions in a custom computer language. In some examples, a textual editor of the cloud application development environment 309 may assist users with constructing various types of statements in a custom computer language. For example, the textual editor may provide syntax highlighting in a custom computer language, intelligent completion of keywords or statements in a custom computer language, automated hints and examples, various types of pop-up information to assist a user in writing or editing instructions in a custom language, visual notification of syntax or other errors, suggested correction of syntax or other errors, automatic suggestion and/or population of objects and/or functions, etc. In some examples, automation and other assistance provided by a textual editor of the cloud application development environment 309 may be based on and may actively utilize one or more data structures 315 (e.g., an object graph based on organizational data 311) associated with implementation of a custom computer language.

In an embodiment, cloud application development environment 309 can include a visual editor (e.g., either with or without a textual editor) to, for example, create, view, maintain, and/or utilize computer instructions in a custom computer language. For example, the visual editor may allow users to build, modify, and perform other operations associated with instructions in a custom computer language via a drag and drop and/or any other types of graphical user interfaces (e.g., a software wizard or setup assistant user interface that presents a user with a sequence of dialog boxes or other types of interfaces that guide the user through a series of steps in generating one or more portions of an application). Further, a visual editor generally also may provide dropdown lists, enhanced browsing, and other visual access to features and operations of a custom computer language, and/or one or more data structures 315 associated with a custom computer language or related application to construct, edit, and/or otherwise utilize instructions in a custom computer language. In some examples, the cloud application development environment 309 may provide a textual editor in combination with the visual editor to allow users to view, utilize, and alternate between both textual and visual editors of a custom query language, for example, as part of the same user interface.

The computing system 310 includes the application policy data 313 which can be implemented on the computing system 310 and can be used to perform one or more operations associated with implementing an application policy associated with the organizational data 311 and/or one or more applications including the application 304, the application 308, and/or application(s) 312. The application 304, the application 308, and/or application(s) 312 can include one or more third-party applications that are separate from, that are operated separate and apart from, and that are not affiliated with the organization that manages, owns, controls and/or maintains the organizational data 311 or an associated organizational data management application on the computing system 310, and/or that determines or implements an application policy associated with the application policy data 313. In one example, third-party applications can be differentiated from organizational applications that, for example, are inherent to, are a part of, or otherwise operate directly or as part of an organizational data management application, system, services, and/or platform.

The application policy data 313 can include one or more rules that determine how one or more applications including, for example, one or more third-party applications or organizational applications are accessed, modified, and/or controlled. For example, the application policy data 313 can use the organizational data 311 that is associated with the application 304 to perform one or more operations on the application(s) 312 and/or the application 308. Also, the application policy data 313 can use the organizational data 311 that is associated with the application(s) 312 to perform one or more operations on the application 304 and/or the application 308. By way of further example, the application policy data 313 can use the organizational data 311 that is associated with the application 308 to perform one or more operations on the application 304 and/or the application(s) 312. In some embodiments, the application policy data 313 can determine how a combination of one or more organizational applications (e.g., applications owned and controlled by an organization that owns and controls the organizational data 311 and/or applications provided with or as part of an organizational data management system used by the organization as a system of record for maintaining the organizational data 311, etc.) and/or one or more third-party applications are accessed, modified, configured, and/or controlled.

The computing system 310 includes the integration data 314, which can reside on the computing system 310 and can be used, for example, to perform one or more operations that integrate the organizational data 311 and associated activities based on the organizational data 311 across one or more different computing systems (e.g., such as computing systems 302, 306, and 310) and/or applications (e.g., such as applications 304, 308, and 312). For example, the integration data 314 can be used to integrate and synchronize organizational data 311 and/or associated operations across an organizational data management application or system (e.g., a system of record for organizational data 311) and each of one or more separate third-party applications that utilize organizational data 311 and/or perform operations based on organizational data 311.

In an embodiment, the integration data 314 can include configuration information associated with integrating and synchronizing data among one or more computing systems and/or applications. For example, the integration data 314 can include information that enables integration between an organizational application (e.g., an application 312 associated with an organizational data management system of record for the organizational data 311) and each of one or more separate third-party applications (e.g., application 304, application 308, etc.) that use or perform operations based on the organizational data 311). Such integration data 314 may include, but is not limited to, information indicating and/or describing various data that enables performance of an integration between applications or systems, such as an integration type information (e.g., flat file, application programming interface or "API", webhook, system call, etc.), security information (authentication information, encryption information, etc.) technical information (e.g., file locations, call information, system naming, application naming, IP address information, port information, etc.), integration flow information (e.g., push, pull, bidirectional, etc.), integration activation (e.g., scheduling or timing information, event information, one or more rules, one or more triggers or criteria, etc.), processing information (e.g., data mappings between the source and target, data validation rules, data transformations, error handling, etc.), and/or any other information used in defining, configuring, and/or integrating an application with each of any number of third-party applications and/or systems.

The computing system 310 includes the data structures 315, which can be implemented on the computing system 310 and used to perform operations involving the organizational data 311 including, but not limited to, performing integration and synchronization of the organizational data 311 with one or more different third-party applications and/or systems, generating and processing computer instructions across one or more different systems based on the organizational data 311, etc. In an embodiment, the data structures 315 generally can include information about the properties or attributes of each of one or more entities associated with the organizational data 311. Data structures 315 also can include information describing relationships associated with one or more entities associated with the organizational data 311 (e.g., explicit relationships defined between entities, virtual relationships determined based on various attributes and data associated with entities, etc.). In some embodiments, the data structures 315 generally can be used in validating and processing the organizational data 311 and/or other information received from third-party applications and/or systems. The data structures 315 also can be used in association with performing or otherwise carrying out one or more operations involving the organizational data 311 including, but not limited to, processing requests, validating queries, generating computer instructions, processing computer instructions, generating workflows, executing workflows, generating triggers, evaluating trigger conditions, performing trigger operations, creating reports, running reports, etc.

In an embodiment, the data structures 315 can include one or more object graphs and/or any other types of data structures that provide information about entities, relationships, rules, constraints, and/or any other aspects of man-aging the organizational data 311. For example, such object graphs can include one or more nodes representing entities associated with the organizational data 311 and one or more edges that connect and represent relationships between the nodes (e.g., explicit edges defining relationships between entities and data, virtual edges inferring relationships between entities and data, etc.). The data structures 315 can also include organizational data and/or associated metadata. In addition, the data structures 315, together or alone, generally may represent one or more structural aspects of an application or system (e.g., such as an organizational data management system that is a system of record for organizational data 311 of an organization). In various examples, the data structures 315 generally may be used to support various operations performed by a system of record including but not limited to performing one or more operations for providing triggers in the system of record. For example, the data structures 315 alone or in combination with configuration data and/or one or more types of information) may be used to generate new instructions in a computer language, which may include a custom computer language provided to users. Further, such new instructions generally may include one or more operations (e.g., one or more underlying data joins) that are identified and included in the generated instructions based on analyzing instructions received in the custom computer language in view of the data structures 315.

The computing system 310 includes the application object data 316, which can be implemented on the computing system 310. For example, the application object data 316 can include any information that is used to implement any type of application object or data structure for an application object that may store, reference, utilize, and/or process data. In an example, a system of record generally may support application objects that include, but are not limited to, application triggers, application reports, application workflows, application tasks, custom objects, and/or any other types of objects.

In an embodiment, application triggers generally may include application objects that are referenced based on an event. For example, an application trigger may be referenced based on one or more internal application or system events (e.g., occurring within a system of record, etc.), based on one or more external application or system events (e.g., occurring outside of a system of record, occurring in a third-party application integrated with a system of record, etc.), or based on a combination of one or more internal application or system events and one or more external application or system events.

Generally, an application trigger may include one or more conditions to be evaluated when the application trigger is referenced by an application or system. For example, such conditions may include, but are not limited to, conditional statements that test one or more aspects of organizational data 311. In one example, when the application trigger is referenced and the conditions of the application trigger are satisfied (e.g., evaluate to true), then one or more operations associated with the trigger are automatically executed. For example, the one or more operations associated with the application trigger may cause an application or system to perform one or more operations internally, may cause the application or system to perform one or more operations in association with an external application or system (e.g., based on an integration, etc.), or may cause the application or system to perform one or more operations internally and to perform one or more operations with an external application or system.

In an embodiment, application reports generally may include any computer instructions that are executed by an application or system to obtain a collection of data or the resulting collection of data. Application workflows generally may refer to an object or objects that define a sequence of steps for automating a process associated with an application or system. Application tasks generally may be objects that are used to define one or more actions or pieces of work to be performed by a user or group of users. Application tasks may be assigned or delegated to one or more users or groups of users. Application tasks also may include information related to a particular task (e.g., start date, due date, etc.). Applications and systems may allow a user of an organization to create custom objects, which may define one or more custom object attributes, custom object operations, and relationships with entities provided by an application or system and/or other custom objects defined for an organization.

The computing system 310 includes the cloud development environment 317, which can be implemented on the computing system 310, for example, to provide users with access to an environment for writing, building, testing, executing, and/or performing any other types of operations involving instructions in a custom computer language. In an embodiment, the cloud development environment 317 may include and/or perform operations associated with the custom language processing engine 318 and, for example, any computer instruction compiler (not shown) and/or any computer instruction generator (not shown) associated with custom language processing engine 318. In addition, the cloud development environment 317 may run on one computing system (e.g., computing system 310) and provide one or more services to applications running on another computing system (e.g., application development environment 305 on computing system 302, cloud application development environment 309 on computing system 306, etc.). Further, the cloud development environment 317 may perform any one or more of the operations previously described with respect to application development environment 305 and/or cloud application development environment 309. Similarly, application development environment 305 and/or cloud application development environment 309 may perform any one or more of the operations described in association with cloud development environment 317.

The computing system 310 includes the custom language processing engine 318, which can be implemented on the computing system 310 and used to perform operations associated with processing requests based on instructions in a custom computer language. In various embodiments, the custom language processing engine 318 may receive requests for processing that include one or more instructions in a custom computer language. For example, such requests may be received from one or more different computing systems (e.g., computing system 302, computing system 306, computing system 310, etc.) and/or one or more different applications (e.g., application 304, application development environment 305, application 308, cloud application development environment 309, application(s) 312, cloud development environment 317, etc.). Custom language processing engine 318 may be associated with or utilize one or more computer instruction compilers (not shown) and/or one or more computer instruction generators (not shown), which for example, may be separate, part of, or integrated with the custom language processing engine 318.

In an embodiment, a computer instruction compiler of the custom language processing engine 318, can be implemented on the computing system 310 and used to perform operations associated with analyzing instructions in a custom computer language including, but not limited to, parsing and analyzing custom computer language instructions based on one or more rules associated with a custom computer language and/or associated data structures 315, for example, to determine whether any error exists in the custom computer language instructions, to identify one or more errors in the custom computer language instructions, to return information about one or more of the identified errors, to determine when the custom computer language instructions are free from error, etc. The computer instruction compiler of the custom language processing engine 318 may include or be associated with a computer instruction generator (not shown) that generates one or more new instructions in a computer language, such as a custom computer language.

In an embodiment, a computer instruction generator of the custom language processing engine 318, can be implemented on the computing system 310 and used to generate one or more new instructions in a custom computer language. For example, the computer instruction generator may generate instructions in a custom computer language for execution based on configuration of one or more application objects and/or data associated with such application objects (e.g., application triggers, application reports, application workflows, application tasks, custom objects, etc.). In one example, such instructions in the custom computer language may be executed by an application of a system of record to perform one or more operations involving the system of record and/or any third-party application integrated with the system of record. In one example, the computer instruction generator may generate instructions in any computer language, for example, to be executed in association with any application or computing system. For example, the computer instruction generator may generate instructions in a different computer language for execution with one or more other applications 312 or data stores (not shown) on or associated with computing system 310 and/or one or more other applications (e.g., application 304, application 308, third-party application 330, third-party application 332, third-party application 334) associated with other computing systems (e.g., computing system 302, computing system 306, computing system 320, computing system 322, computing system 324).

In various examples, third-party applications (e.g., third-party application 330, third-party application 332, third-party application 334) generally may be any type of computer application referenced within the disclosure or otherwise available. In some examples, each third-party application may be associated with a respective computing system (e.g., computing system 320, computing system 322, computing system 324). In some examples, each third-party application may be associated with one or more different computing systems. In some examples, multiple third-party applications may run on each of one or more different computing systems.

In an embodiment, an application store computing system (not shown) provides an organization with access to multiple different integration applications (not shown) for integrating organizational data 311 and/or associated processes with and across various different applications and/or systems (e.g., application(s) 312, third-party application 330, third-party application 332, third-party application 334, etc.). An application store computing system also may provide an organization with one or more other types of applications, including but not limited to, platform utility apps that provide additional functionality to an organizational data management application or system, other apps that may include integration-related applications, and/or any other types of applications. Generally, the application store computing system may provide one or more various applications for a flat fee, based on a subscription purchase, for a fee based on usage, for a fee based on a number of users, computing systems, processors, or any other criteria, as part of a limited trial, for free, and/or generally under any type of arrangement. In an embodiment the application store computing system is managed and provided by the same party that provides an organizational data management system to organizations. For example, the integration applications provided by the application store computing system generally may be specialized for use with the organizational data management system (e.g., not end-user versions of applications that would be installed for general purpose use by end-users on end-user devices or for use by end-users via cloud services or any other types of services).

In an embodiment, the integration applications generally can be any application that allows an organization to manage any one or more aspects associated with providing one or more corresponding end-user applications to individual members (e.g., employees), teams, roles, departments, and/or any other grouping or categorization of individuals in an organization. For example, each of the integration applications can be used by an organization to control and automate various tasks associated with provisioning, configuring, maintaining, and integrating third-party applications. In some embodiments, one or more of the integration applications can allow an organization to configure automated assignment of a corresponding end-user application to one or more individuals, user account creation, single sign-on setup, provisioning, installation, setup, and/or maintenance of corresponding end-user applications (e.g., third-party applications or other applications available for use by end users) provided to particular individuals, groups, and/or one or more devices associated with such individuals or groups in the organization (e.g., via installation on respective user devices, via a cloud application service available to end users, etc.).

In an embodiment, one or more of the integration applications can provide integration of organizational data 311 and associated services with one or more corresponding third-party applications (e.g., application 304 on computing system 302, application 308 on computing system 306, application(s) 312 on computing system 310, third-party application 330 on computing system 320, third-party application 332 on computing system 322, third-party application 334 on computing system 324, etc.) that utilize and/or perform operations based on organizational data 311. For example, each of the integration applications can provide one or more of user account creation, single sign-on integration, user account suspension or removal, user management, group management, user privileges, user data access, user data control, template management, data integration, process automation, and/or any other types of integration between applications (e.g., third-party applications or other applications) that are associated with organizational data 311 of an organization.

In an embodiment, the integration applications and/or other applications provided by the application store computing system may include, but are not limited to, collaboration apps, support apps, design apps, development apps, finance and legal apps, human resources (HR) and benefits apps, information technology (IT), device management, and security apps, office management apps, sales and marketing apps, charitable apps, platform utility apps, and/or other apps. Generally, various different types of applications provided by the application computing system may be organized, categorized, grouped, presented, and/or otherwise offered in any type of arrangement, and thus are not limited to any particular examples discussed herein, which are provided for illustration purposes only.

In an embodiment, collaboration apps may include, for example, any applications that provide scheduling, communications, document sharing and management, electronic signature services, project management, productivity, and/or any other types of applications that facilitate work between individuals, groups, and/or parties.

In an embodiment, support apps may include, for example, any applications that provide services associated with customer support, technical support, issue reporting, issue management and escalation, tracking and managing help desk tickets, and/or any other types of applications that facilitate customer, business, and/or technology support.

In an embodiment, design apps may include, for example, any applications that provide services associated with creating graphic designs, product designs, prototypes, drawings, graphical user interfaces, user experiences, and/or any other types of applications that facilitate the creation of designs, interfaces, and/or artistic works.

In an embodiment, development apps may include, for example, any applications that provide services associated with software development, software testing, source code control and management, source code scanning, application testing, process automation, cloud hosting and services, system monitoring, error reporting and alerts, machine learning, and/or any other types of applications that facilitate activities associated with building, maintaining, or deploying software applications.

In an embodiment, finance, operational, and legal apps may include, for example, any applications that provide services associated with accounting systems, budgeting systems, vendor management systems, payment systems, travel systems, expense management systems, supply chain systems, manufacturing systems, employee and/or organizational compliance and governance systems, vendor management systems, contract management systems, and/or any other types of applications and/or systems used to manage various aspects of an organization.

In an embodiment, human resources (HR) and benefits apps may include, for example, any applications that provide services associated with recruiting and hiring, temporary staffing, background checks, payroll and benefits, training and onboarding, retirement planning and contributions, reward and bonus programs, employee training, learning management systems, performance management, insurance, employee compliance with jurisdictional rules, regulations, ordinances, laws, etc., organizational compliance with jurisdictional rules, regulations, ordinances, laws, etc., and/or systems any other types of applications or systems associated with employee-related activities.

In an embodiment, information technology (IT), device management, and security apps may include, for example, any applications that provide services associated with device management, technology, information security, password management, and/or any activities associated with managing applications, systems, devices, or associated technology.

In an embodiment, office management apps may include, for example, any applications that provide services associated with facilities management, receptionist services, physical access, visitor access, catering services, office layout, office assignments, and or any other types of applications or systems associated with performing office management.

In an embodiment, sales and marketing apps may include, for example, any applications that provide services associated with social media, analytics, advertising, event management, customer relationship management, content creation and distribution, public relations, business generation, campaign management, and/or any other types of similar or related activities.

In an embodiment, charitable apps may include, for example, any applications that provide services associated with donations, charitable giving, crowdfunding, etc.

In an embodiment, platform utility apps may include, for example, any applications from a provider that allow an organization to utilize software applications, systems, or services that have been purchased or that are otherwise available from the provider. For example, a provider of an organizational data management system can allow an organization to access and utilize standard services and/or enhanced services via one or more of the platform utility apps. In some embodiments, the platform utility apps operate from and/or are directly integrated with applications, systems, and/or services obtained from a provider. For example, such platform utility apps can allow one or more users of an organization to customize a particular implementation or instance of provider software that is associated with the organization. In one example, one of the platform utility apps can allow the creation and/or modification of one or more custom fields in association with one or more entities, the creation and/or modification of one or more relationships among the entities, the creation and/or modification of one or more default system rules or custom rules, the addition and/or use of custom fields, custom relationships and/or custom rules in various workflows, triggers, tasks, reports, integrations, etc. In some embodiments, users may create and modify custom fields, relationships, rules, tables, entities, and any other various aspects of an organizational data management system in a utility application or otherwise using a custom computer language provided by the organizational data management system.

In an embodiment, other apps may include, for example, any types of applications that may be used by individuals and/or organizations. The other apps may include, for example, any other category of integration applications and/or any other types of applications that can be executed by a computing system or device.

In an embodiment, authorized users of an organization with the appropriate privileges may access one or more services of the application store computing system directly, for example, via a website, web page, desktop application, mobile application, and/or any other type of application to browse, view, search, compare, evaluate, download, install, configure, upgrade, uninstall, and/or perform any other types of activities associated with the integration applications or any other types of applications provided via the application store computing system. In some embodiments, authorized users of an organization with the appropriate privileges may access one or more services of the application store computing system indirectly, for example, through another application (e.g., application 312) and/or another computing system (e.g., computing system 310). In some embodiments, the application store computing system can be provided on the same computing system with other applications and services (e.g., running on computing system 310).

In an embodiment, any one or more users of an organization, such as an administrator, manager, or one or more other users associated with a particular role and/or one or more particular privileges each may install and/or configure each of one or more different integration applications for use by the organization. For example, any such user with the appropriate privileges may install one or more of the integration applications for the organization on the computing system 310 or any other computing systems or devices. Also, any such user with the appropriate privileges may configure integration data 314 associated with each of one or more integration applications. In some embodiments, a user with the appropriate privileges may delegate authority to one or more other users to perform installation and/or configuration of one or more of the integration applications for an organization.

In an embodiment, an organizational data management system is provided via at least one computing system to allow each of one or more different organizations to centrally manage their own organizational data 311. For example, the organizational data management system can be provided as a centralized system of record for storing and managing various types of organizational data 311 of an organization. The organizational data management system also can provide various types of integration across different third-party applications that utilize, that perform processing involving or based on, and/or that are otherwise associated with organizational data 311. The organizational data management system also can automate various processing based on the organizational data 311 including, but not limited to the automation of processing performed across various third-party applications based on the organizational data 311. In various embodiments, the organizational data management system can be provided via one or more different computing systems, one or more different applications, and/or via one or more different services, for example, to one or more different organizations over a computer network.

In an embodiment, a separate instance of an organizational data management system generally can be provided to each of one or more different organizations, for example, to allow each organization to independently configure, manage, and integrate their own instance of an organizational data management system, and to secure and insulate organizational data 311 from outside parties. For example, separate instances of an organizational data management system generally may be provided to different organizations using different computer hardware devices, different software applications, different instances of software applications running in an isolated space, different databases, physically partitioned databases, and/or in various other ways.

In an embodiment, an organizational data management system generally enables organizations to efficiently manage organizational data 311 and associated processing that occurs based on the organizational data 311. For example, an organizational data management system may be used as a centralized system of record that is integrated with other computing systems and applications (e.g., third-party applications 330, 332, 334) that generate, utilize, process, and/or perform activities based on organizational data 311. Such integration generally allows an organizational data management system to orchestrate and automate processing of organizational data 311 and associated activities across numerous different applications that are not in communication or coordination with one another. In some embodiments, an organizational data management system can allow appropriate users (e.g., authenticated, authorized, privileged, etc.) of an organization to, for example, manage organization information, settings of an organizational data management system, onboarding of employees, offboarding of employees, employee information, organizational structure and locations, employee placement in departments and teams, workflows and tasks, reports, documents, and/or any other information associated with organizational data 311.

In an embodiment, an organization uses an organizational data management system that allows the organization to manage organizational data 311 and activities performed based on the organizational data 311. In some embodiments, an organization can install and use an organizational data management system on a computing system (e.g., computing system 310 or any other computing system) that is dedicated to the organization. Also, an organizational data management system can include any one or more of organizational data 311, application(s) 312, application policy data 313, integration data 314, data structures 315, application object data 316, cloud development environment 317, custom language processing engine 318, and/or any other information associated with managing, processing, and performing activities associated with organizational data 311. In addition, an organizational data management system may provide and utilize its own custom computer language that allows business users to access and perform various operations using simplified computer instructions based on structure of organizational data 311. Further, an organizational data management system may provide various features and user interfaces to configure and to automate the execution of triggers in the custom computer language to perform various activities within the organizational data management system and across one or more other applications (e.g., third-party application 330, third-party application 332, third-party application 334) running on one or more different computing systems (e.g., computing system 320, computing system 322, computing system 324).

In an embodiment, an organizational data management system may be provided by another party for use by an organization. For example, another party such as a software application provider may host or otherwise provide a separate instance of an organizational data management system to each of one or more different organizations allowing each organization to independently manage their own organizational data 311. In such embodiments, each separate instance of an organizational data management system provided to an organization can respectively include any one or more of organizational data 311, application(s) 312, application policy data 313, integration data 314, data structures 315, application object data 316, and/or any other information associated with managing, processing, and performing activities associated with organizational data 311 for the particular organization. As such, an organizational data management system may be a cloud-based platform that maintains organizational data 311 and other information associated with each of one or more different organizations and that allows each of the different organizations to independently manage their own respective organizational data 311 and related processes independently from any other organization.

FIG. 4 depicts a flow diagram of an example method 400 for determining compliance with one or more compliance rules in a compliance evaluation system (e.g., a computing system) that manages organizational data, according to example embodiments of the disclosure. The compliance evaluation system may be embodied by one or more computing devices or computing systems including, for example, the computing system 110, the remote computing system 130, the one or more computing devices 152, the computing device 200, the computing system 302, and/or the computing system 310. One or more portions of the method 400 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 400 can be executed or implemented as an algorithm on the hardware devices or systems disclosed herein. FIG. 4 depicts operations performed in a particular order for purposes of illustration and discussion. However, those of ordinary skill in the art, in view of the disclosure provided herein, will understand that various operations of any of the methods disclosed herein can be adapted, modified, rearranged, omitted, and/or expanded without deviating from the scope of the disclosure.

According to some embodiments, the computing system of method 400 can implement an organizational management platform to manage applications (e.g., application 304, application 308) for an organization. The computing system can include one or more databases (e.g., one or more memory devices 116, one or more memory devices 136, one or more memory device 156, one or more memory devices 202) that collectively store organizational data (e.g., data 118, data 138, data 158, organizational data 203, organizational data 311) associated with the organization. The organizational data can include an object graph data structure comprising a plurality of data objects associated with the organizational data.

In some instances, the computing system can include one or more processors, one or more databases, and one or more memory devices. The one or more databases can store organizational data associated with one or more organizations. In some instances, a plurality of organizations can be part of a professional employer organization (PEO). The one or more memory devices can store instructions that, when executed by the one or more processors, cause the computer system to perform operations described in method 400.

At 402, the computing system can access, from the organizational data, employee information associated with a first employee object from a plurality of employee objects. The organizational data (e.g., organizational data 203, organizational data 311) can include a plurality of employee objects respectively associated with a plurality of employees of the organization. The employee objects may be defined based on or related to employee data or information (e.g., employee data 204) of the organization. The employee data can include the number of employees at the organization, the age of the employees, the gender of the employees, the position or job title of the employees, an exemption status of the employees, family information of the employees, licenses and/or certifications held by the employees, work schedule information of the employees, pay information of the employees, leave information of the employees (e.g., vacation leave, sick leave, maternity/paternity leave, etc.), benefits information of the employees, and any other relevant information that may be required or useful for determining compliance of an employee with respect to various compliance rules.

At 404, the computing system can access, from the organizational data, employee information associated with a first jurisdiction object from a plurality of jurisdiction objects. The organizational data (e.g., organizational data 203, organizational data 311) can include a plurality of jurisdiction objects respectively associated with a plurality of jurisdictions. The jurisdiction data 206 may include information associated with jurisdictions in which the organization and/or employees of the organization operate or may operate. The jurisdiction data 206 can include jurisdiction information for one or more jurisdictions and may include a jurisdiction name, a jurisdiction type (e.g., one or more of a zip code, a city, a county, a state, a country, etc.), and any other information which may be used to identify the jurisdiction. An employee may be associated with a plurality of jurisdictions (e.g., a city, a county, a state, and so on). The jurisdiction data 206 may be associated with the compliance data 205, for example. For example, compliance data 205 may be mapped to a particular jurisdiction from the jurisdiction data 206, or vice versa.

At 406, the computer system can import one or more compliance parameters relating to the first jurisdiction object to generate one or more compliance rules parameterized for the first jurisdiction object. Compliance in the compliance evaluation system refers to a set of conditions operating on employee information (e.g., an employee role) and company data (e.g., a size of the company), and the thresholds set in the compliance parameters. For example, the compliance parameters can store values of various thresholds for a corresponding jurisdiction. An example compliance parameter for a minimum wage compliance rule may include a value for a minimum hourly wage to satisfy a jurisdictional requirement. An example compliance parameter for a sick leave compliance rule may include a value for a minimum amount of leave to be provided to an employee to satisfy a jurisdictional requirement. An example compliance parameter for an overtime compliance rule may include a value for a minimum amount of pay to be provided to an employee (e.g., 1.5 times a regular rate of pay) to satisfy a jurisdictional requirement. Another example compliance parameter for an overtime compliance rule may include a value for a maximum number of hours an employee is allowed to work (e.g., 40 hours per week for an employee who is not allowed to work overtime, or a 10 hour daily limit for an employee whose work hours are restricted such as a truck driver) to satisfy a jurisdictional requirement. Other compliance parameters may be used to derive or generate a compliance rule. For example, a compliance parameter relating to a company size may be imported, so as to determine a compliance rule that is applicable to an employer or organization having that size. For example, jurisdictions may provide that a company with less than 500 employees has a different minimum wage threshold than a company with more than 500 employees. In response to importing compliance parameters for a particular jurisdiction, (e.g., the first jurisdiction object) one or more compliance rules parameterized for the first jurisdiction object can be generated. As an example, a compliance rule may be conditioned on various compliance parameters (e.g., the number of employees in the organization, the number of employees in the organization located in the applicable jurisdiction, whether an employee has an exempt status, a minimum wage threshold value, a minimum sick leave amount per a preset duration of hours worked, a minimum vacation leave amount per a preset duration of hours worked, a specified amount rate of pay for remaining sick leave and/or vacation leave upon termination, a specified amount of maternity and/or paternity leave, an expiration or renewal date for a license and/or certification, a value for a number of training hours required for a given duration of time (e.g., continuing legal education hours required in a year), and so on).

At 408, the computer system can determine compliance with the one or more compliance rules parameterized for the first jurisdiction object with respect to the employee object, based on the employee information and the one or more compliance parameters. For example, the computing system may perform a Boolean operation with respect to the compliance rules parameterized for the first jurisdiction object with respect to the employee object to determine whether the employee and/or organization is in compliance with the particular compliance rule for that particular jurisdiction. As an example, a minimum wage compliance rule for a particular jurisdiction may be defined by a "greater than" relational operator between a daily hourly wage as included in the employee data and a daily hourly wage threshold value as a compliance parameter imported into a compliance object that is related to or associated with the particular jurisdiction. For example, conditions of a compliance rule may be stored as an expression tree in a database and the compliance parameters for applicable jurisdictions may be stored separately. With the compliance conditions stored as data, actual checks for compliance may be performed in a computer language (e.g., a high-level language (HLL)) by translating the conditions at run time to expressions in the HLL and substituting the data objects to be checked and the compliance parameters for the particular jurisdiction.

At 410, the computing system can, based on the determination, provide an output indicating whether the one or more compliance rules parameterized for the first jurisdiction object are being complied with, with respect to the first employee object. For example, the computing system can present, using a user interface, a compliance report based on the results of the compliance evaluation(s). In some instances, the user interface can be presented on a user device of a HR administrator of the organization, an employee manager, an employee, an information technology manager, and the like. For example, the computing system 110 in FIG. 1 can be associated with a user such as a HR administrator, an employee manager, an employee, an information technology manager, and the like, and the user interface can be presented on the output device 124 (e.g., a display). Subsequently, the user can provide a user input using the one or more input devices 122 of the computing system 110. The compliance report can indicate a compliance status for individual employees of the organization. In some implementations, when an employee is determined to not be in compliance with one or more compliance rules, the output can include an alert and/or notification which is generated and transmitted to one or more of the employee, a manager of the employee, a human resources officer, a compliance officer, and the like. In some implementations, when an employee is determined to not be in compliance with one or more compliance rules, the output can include the computing system disabling certain organizational resources with respect to the employee. For example, the output may include preventing an employee from accessing certain organizational resources (e.g., prevented from clocking-in via a computing system, prevented from accessing a vehicle belonging to the organization by causing the vehicle to be locked or causing a key held by the employee to be disabled, prevented from accessing a computing device belonging to the organization by disabling a log-in page for the employee, prevented from accessing supplies belonging to the organization by electronically locking out the employee, etc.). In some implementations, when the employee is determined to be in compliance with one or more compliance rules after not being in compliance with the one or more compliance rules (e.g., corrective action has been taken such as renewing a license, completing required training courses, taking required time-off before returning to work, etc.), access to the organizational resources may be restored to the employee.

In some implementations, when an organization is determined to not be in compliance with one or more compliance rules with respect to an employee, the output may include an alert and/or notification which is generated and transmitted to one or more of the employee, a manager of the employee, a human resources officer, a compliance officer, and the like. In some implementations, when the organization is determined to not be in compliance with one or more compliance rules with respect to an employee, the output may include preventing the organization from performing certain operations. For example, if the organization is determined to not be in compliance with an overtime rule with respect to an employee, the output may include preventing an organization from scheduling the employee for work until the organization is once again compliant (e.g., causing an error to be generated when a manager attempts to electronically schedule an employee for additional hours after a number of hours the employee is allowed to work in a given time period is greater than a threshold value). For example, if the organization is determined to not be in compliance with a sick leave policy rule with respect to an employee, the output may include preventing the organization from scheduling the employee for work until the organization is once again compliant (e.g., by assigning a sick leave policy to the employee).

Figure 5A:
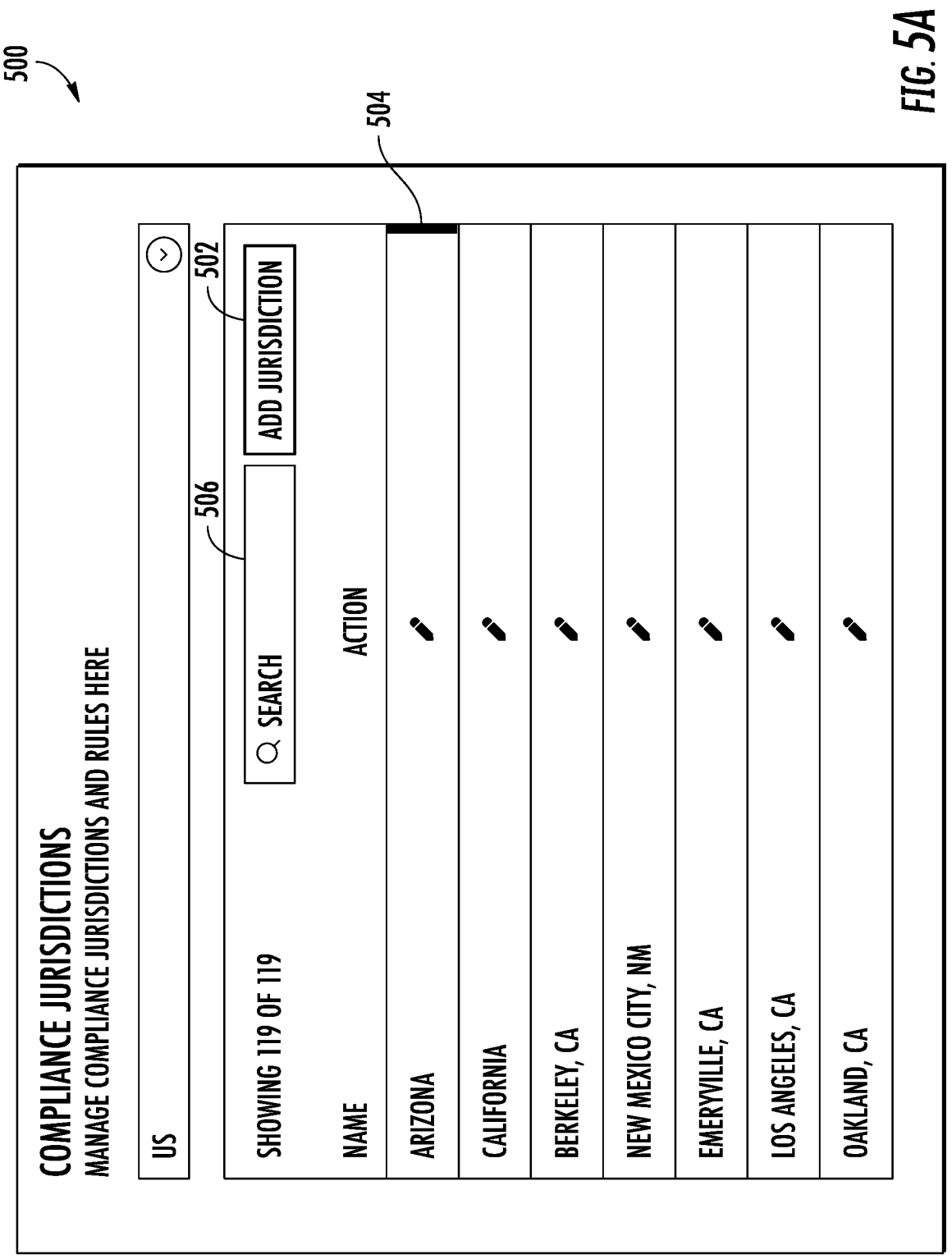
FIGS. 5A-5B depict example user interfaces for a user to input jurisdiction information for a jurisdiction in association with a compliance evaluation system, according to example embodiments of the disclosure.
Figure 5B:
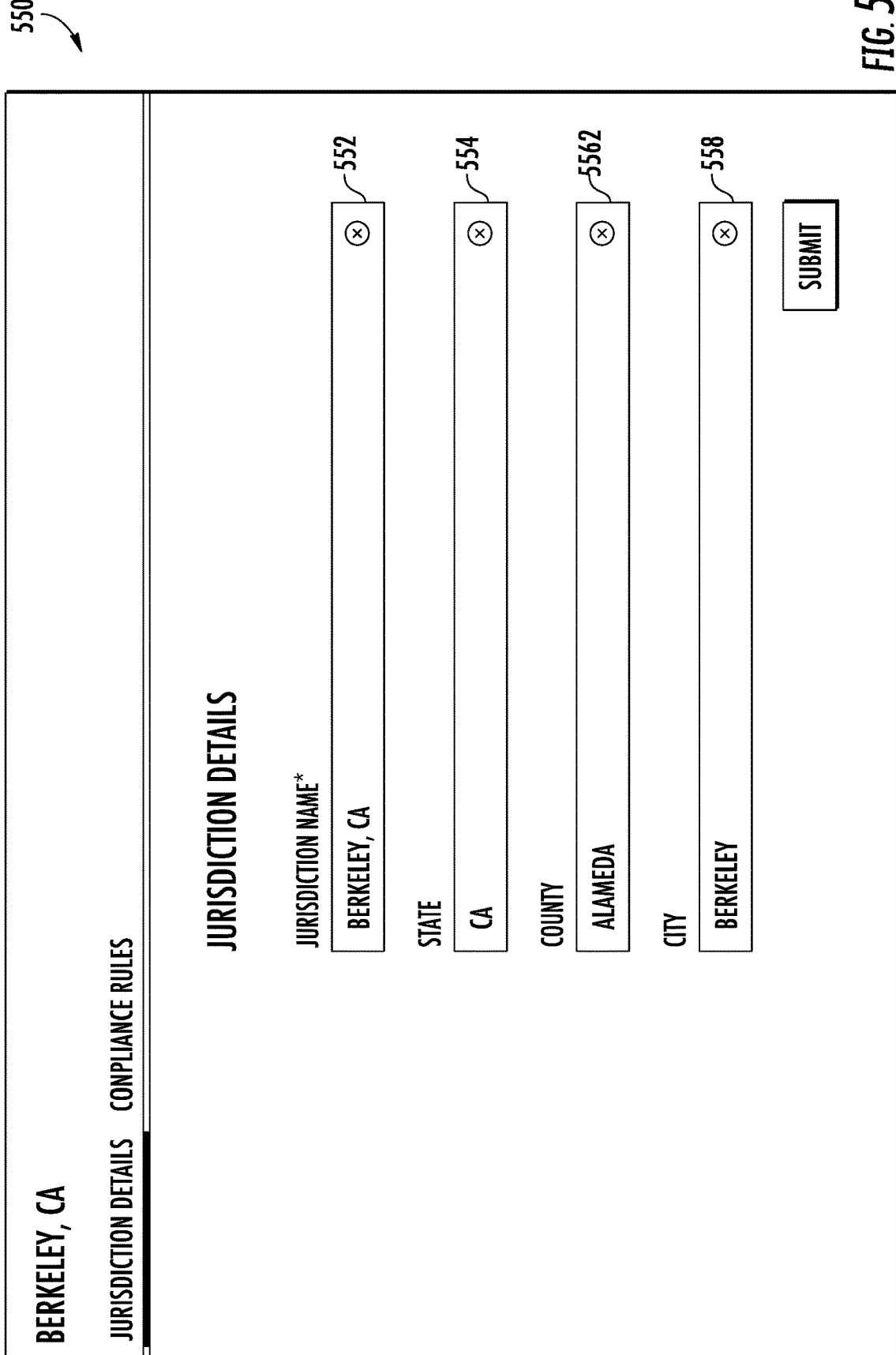

FIGS. 5A-5B depict example user interfaces for a user to input jurisdiction information for a jurisdiction in association with a compliance evaluation system, according to one or more example embodiments disclosed herein. For example, the computing system can present the user interfaces of FIGS. 5A-5B on a user device of a HR administrator of the organization, an employee manager, an employee, an information technology manager, and the like. For example, the computing system 110 in FIG. 1 can be associated with a user such as a HR administrator, an employee manager, an employee, an information technology manager, and the like, and the user interface can be presented on the output device 124 (e.g., a display). Subsequently, the user can provide a user input using the one or more input devices 122 of the computing system 110. The disclosure is not limited to the example user interfaces shown in FIGS. 5A-5B and other configurations of the user interfaces are within the scope of the disclosure.

For example, with reference to FIG. 5A, a user interface 500 for compliance jurisdictions includes user interface element 502 to add a jurisdiction to the compliance evaluation system. For example, the user interface 500 includes a selectable list of jurisdictions in the form of user interface elements 504 (e.g., Arizona, California, Berkeley, California, and so on) that are stored in the compliance evaluation system. For example, the user interface 500 includes a search field 506 to search for jurisdictions that are stored in the compliance evaluation system.

For example, with reference to FIG. 5B, a user interface 550 for a particular compliance jurisdiction (Berkeley, California) includes user interface element 502 to provide or edit a name of the jurisdiction. For example, the user interface 550 includes user interface elements 554, 556, 558 to provide or edit details regarding the jurisdiction, including a state, county, and city, respectively.

Figure 6A:
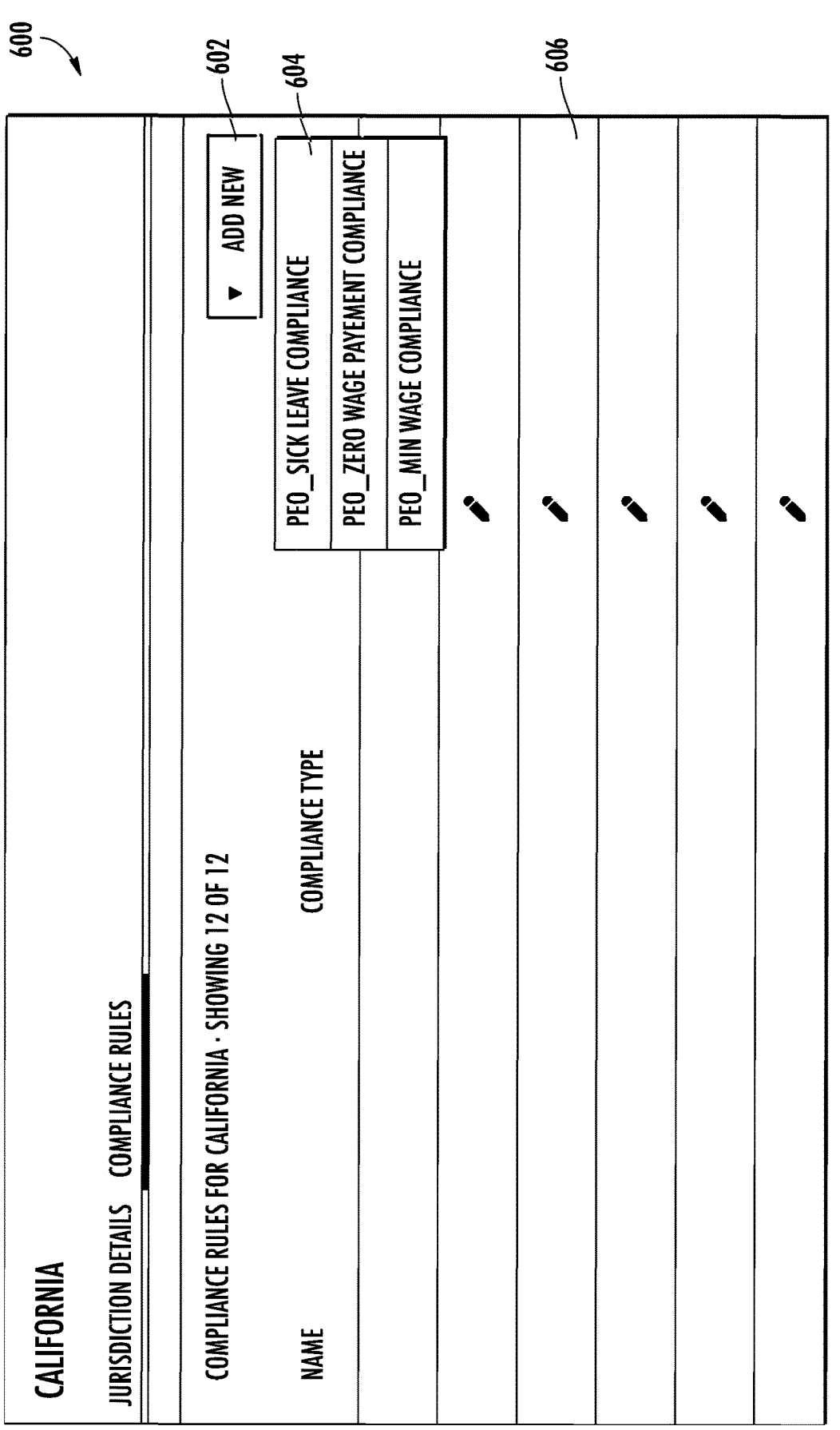

FIGS. 6A-6C depict example user interfaces for a user to input compliance information (e.g., compliance properties and compliance parameters) for a jurisdiction in association with a compliance evaluation system, according to one or more example embodiments disclosed herein. For example, the computing system can present the user interfaces of FIGS. 6A-6C on a user device of a HR administrator of the organization, an employee manager, an employee, an information technology manager, and the like. For example, the computing system 110 in FIG. 1 can be associated with a user such as a HR administrator, an employee manager, an employee, an information technology manager, and the like, and the user interface can be presented on the output device 124 (e.g., a display). Subsequently, the user can provide a user input using the one or more input devices 122 of the computing system 110. The disclosure is not limited to the example user interfaces shown in FIGS. 6A-6C and other configurations of the user interfaces are within the scope of the disclosure.

For example, with reference to FIG. 6A, a user interface 600 for compliance rules associated with the jurisdiction of California is shown. For example, the user interface 600 includes user interface element 602 to add a new compliance rule to the compliance evaluation system with respect to the jurisdiction of California. For example, the user interface 600 includes a selectable list of compliance rules in the form of user interface elements 604 which are associated with the jurisdiction of California (e.g., PEO_SickLeaveCompliance, PEO_ZeroWagePaymentCompliance, and PEO_MinWageCompliance), and are stored in the compliance evaluation system. For example, the user interface 600 includes additional user interface element 606 to indicate that compliance rules stored in the compliance evaluation system can be selected for editing.

For example, with reference to FIGS. 6B-6C (noting FIG. 6C is a continuation of the user interface shown in FIG. 6B), a user interface 650 for a particular compliance rule (PEO_MinWageCompliance) for the jurisdiction of California is shown. For example, user interface 650 includes a plurality of user interface elements 652, 654, 656, 658, 660, 662, 664, 668, 670, 672, 674, 676, and 678. Compliance property data or compliance parameter information may be input as conditions for minimum wage compliance rule via one or more of the user interface elements illustrated in FIGS. 6A-6B. For example, user interface element 652 is provided to input a name of the compliance rule, user interface elements 654, 656 are provided to input start and end dates for a period of time the compliance rule is valid, user interface element 658 is provided to input an offset for a due date with respect to the compliance rule, user interface elements 660, 662 are provided to input minimum and maximum company sizes which are valid with respect to the compliance rule, user interface elements 664, 668 are provided to input minimum and maximum company sizes within the jurisdiction which are valid with respect to the compliance rule, user interface element 670 is provided to input an exemption status of an employee that the compliance rule is applicable to (e.g., a non-exempted employee), user interface element 672 is provided to input an exemption type of an employee that the compliance rule is applicable to (e.g., a computer software engineer employee), user interface element 674 is provided to input a salary unit that the compliance rule is applicable to (e.g., a salary in units of a month), user interface element 676 is provided to input whether the compliance rule is applicable to an employee who is tipped, and user interface element 678 is provided to input a minimum wage threshold that satisfies the compliance rule (e.g., a minimum wage threshold of $10,000 per month). Accordingly, based on the compliance parameters input to the user interface 650, the compliance rule is subsequently generated based on the defined jurisdiction object of California and compliance parameters imported to a compliance object where the minimum wage rule is conditioned on various operands. For example, based on the inputs shown in FIG. 6C, the minimum wage rule may be conditioned on non-exempt computer software engineers who do not receive tips in the jurisdiction of California, where the monthly wage of a non-exempt computer software engineer must be greater than $10,000 to satisfy the compliance rule, which corresponds to the compliance parameter value set for the parameter Minimum Wage Threshold.

FIGS. 7A-7B depict example user interfaces which display outputs indicating whether one or more compliance rules parameterized for a jurisdiction object are being complied with, with respect to employee objects (e.g., employees) associated with the organization, according to examples of the disclosure. For example, the computing system can present the user interfaces of FIGS. 7A-7B on a user device of a HR administrator of the organization, an employee manager, an employee, an information technology manager, and the like. For example, the computing system 110 in FIG. 1 can be associated with a user such as a HR administrator, an employee manager, an employee, an information technology manager, and the like, and the user interface can be presented on the output device 124 (e.g., a display). The user can provide a user input with respect to the user interfaces shown in FIGS. 7A-7B using the one or more input devices 122 of the computing system 110. The disclosure is not limited to the example user interfaces shown in FIGS. 7A-7B and other configurations of the user interfaces are within the scope of the disclosure.

For example, with reference to FIG. 7A, a user interface 700 is an example output which displays information indicating whether an employee and/or organization is compliant with a given compliance rule, according to examples of the disclosure. For example, the user interface 700 includes user interface element 702 to search for an output entry (e.g., based on an employee name, a type of issue, a date associated with the compliance rule, etc.). For example, the user interface 700 includes user interface element 704 to add a filter to output compliance evaluations meeting a certain criteria (e.g., compliance evaluations for a given date or date range such as a date of the compliance evaluation or a date by which infractions are to be resolved, compliance evaluations for particular employees, compliance evaluations having a particular urgency level, compliance evaluations with respect to a particular compliance rule, such as sick leave compliance evaluations or minimum wage compliance evaluations, etc.). For example, the user interface 700 includes user interface element 706 which corresponds to an area of the user interface 700 which displays a selectable entry regarding a compliance evaluation for a particular employee. For example, an entry may include a date of the compliance evaluation (date detected), an identity of the employee (e.g., name and job title), a date that a compliance infraction is to be resolved by (resolution deadline), an urgency level of the compliance infraction (e.g., very high, high, medium, low), and an issue type which identifies the compliance rule that has been evaluated and indicates whether the compliance rule is violated (e.g., sick leave violation) or is satisfied.

For example, the user interface 700 may be output on a display, or may be part of a compliance report that is generated and output to various users of the compliance evaluation system. For example, when an organization and/or employee is determined to not be in compliance with one or more compliance rules with respect to an employee, the computing system may generate and transmit an alert and/or notification to one or more of the employee, a manager of the employee, a human resources officer, a compliance officer, and the like. For example, the compliance report may pertain to a plurality of employees such that, for example, a manager of the employee, a human resources officer, a compliance officer, and the like, can quickly and easily ascertain a compliance status of a plurality of employees at one time, and can quickly and easily ascertain dates for a plurality of employees becoming compliant, an urgency level, and possible actions needed to become compliant. In addition, a manager of the employee, a human resources officer, a compliance officer, and the like, can quickly and easily ascertain an overall compliance status of employees of the organization (e.g., a 80% compliance rate with respect to a certain compliance rule for certain employees having similar parameters such as non-exempt, a similar job title, etc.).

For example, with reference to FIG. 7B, a user interface 750 is an example output which displays information indicating details of any issues identified based on a compliance evaluation being performed with respect to an employee of a particular jurisdiction, according to examples of the disclosure. For example, the user interface 750 includes user interface element 752 to indicate a date of the compliance evaluation (date detected), user interface element 754 to indicate a date that a compliance infraction is to be resolved by (resolution deadline), user interface element 756 to indicate an issue type which identifies the compliance rule that has been evaluated and indicates whether the compliance rule is violated (e.g., sick leave violation). For example, the user interface 750 includes user interface element 758 to provide an option for a user to update certain information relating to the compliance rule so as to resolve the infraction (e.g., an option to update a sick leave policy with respect to an employee to bring the employee into compliance). For example, the user interface 750 includes user interface element 760 to provide an option for a user to mark a compliance evaluation infraction as having been resolved, for example, after updating the employee's sick leave policy so that the user receives an appropriate amount of sick leave.

For example, the user interface 750 includes user interface element 762 to provide an area for additional information regarding the compliance evaluation (e.g., a sick leave violation) identified by the computing system as a result of performing a compliance evaluation for the jurisdiction of California. For example, the additional information shown with respect to user interface element 762 in FIG. 7B provides a reason for the compliance rule being found not to be complied with, with respect to a particular employee. For example, the additional information regarding the compliance evaluation may include information that can be used to resolve the compliance infraction (e.g., information to create or update a sick leave policy with respect to an employee so that the employee and/or organization is brought into compliance).

For example, the user interface 750 includes user interface element 764 to provide an area for additional information regarding a recommended solution for curing a compliance violation (e.g., a sick leave violation) identified by the computing system as a result of performing a compliance evaluation for the jurisdiction of California. For example, the additional information regarding a recommended solution for curing a compliance violation shown in FIG. 7B includes information for adding an employee to a sick leave policy having a minimum number of hours of paid sick leave per a certain number of hours worked.

Figure 8:
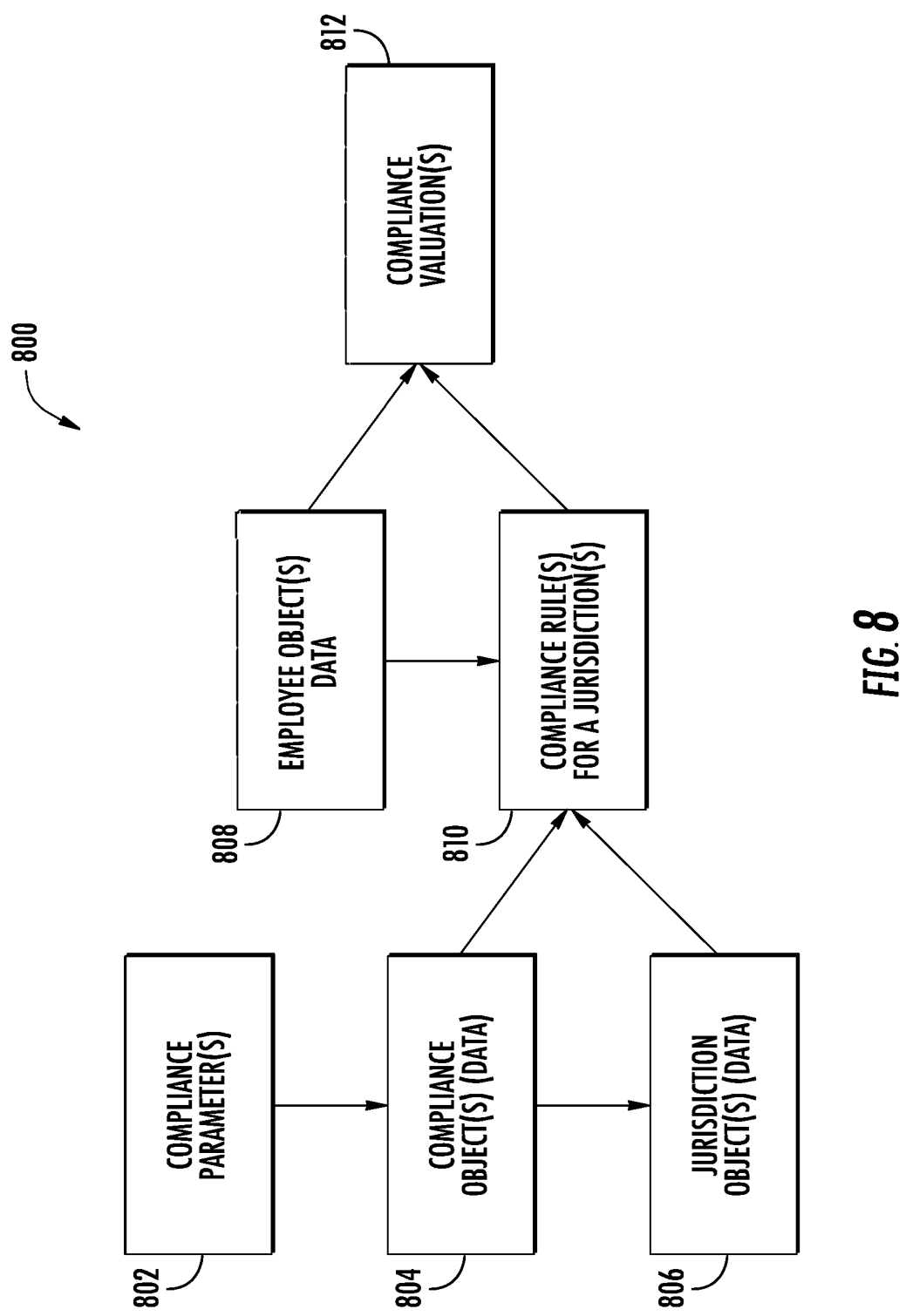
FIG. 8 depicts an example of generating a compliance evaluation at runtime, according to example embodiments of the disclosure.

FIG. 8 depicts an example of generating a compliance evaluation at runtime, according to example embodiments of the disclosure. A compliance evaluation system 800 as represented in the example of FIG. 8 may be embodied by one or more computing devices or computing systems including, for example, the computing system 110, the remote computing system 130, the one or more computing devices 152, the computing device 200, the computing system 302, the computing system 306, and/or the computing system 310. One or more portions of the compliance evaluation system 800 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the compliance evaluation system 800 can be executed or implemented as an algorithm on the hardware devices or systems disclosed herein. FIG. 8 depicts operations performed in a particular order for purposes of illustration and discussion. However, those of ordinary skill in the art, in view of the disclosure provided herein, will understand that various operations of any of the methods disclosed herein can be adapted, modified, rearranged, omitted, and/or expanded without deviating from the scope of the disclosure. The compliance evaluation system 800 can include one or more databases (e.g., one or more memory devices 116, one or more memory devices 136, one or more memory device 156, one or more memory devices 202) that collectively store organizational data (e.g., data 118, data 138, data 158, organizational data 203, organizational data 311) associated with the organization. The organizational data can include an object graph data structure comprising a plurality of data objects associated with the organizational data.

As shown in FIG. 8, the compliance evaluation system 800 includes one or more compliance parameters 802, one or more compliance objects (data) 804, one or more jurisdiction objects (data) 806, one or more employee objects (data) 808, one or more compliance rules for one or more jurisdictions 810, and one or more compliance evaluations 812.

In this example, a computing system (e.g., the computing system 110) is configured to perform one or more compliance evaluations 812 according to the one or more employee objects (data) 808 and one or more compliance rules for one or more jurisdictions 810.

The one or more compliance parameters 802 may be used to parameterize a compliance object for generating the one or more compliance rules for one or more jurisdictions 810. For example, the one or more compliance parameters 802 can store values of various thresholds for a corresponding jurisdiction. An example compliance parameter for a minimum wage compliance rule may include a value for a minimum hourly wage to satisfy a jurisdictional requirement. An example compliance parameter for a sick leave compliance rule may include a value for a minimum amount of leave to be provided to an employee to satisfy a jurisdictional requirement. An example compliance parameter for an overtime compliance rule may include a value for a minimum amount of pay to be provided to an employee (e.g., 1.5 times a regular rate of pay) to satisfy a jurisdictional requirement. Another example compliance parameter for an overtime compliance rule may include a value for a maximum number of hours an employee is allowed to work (e.g., 40 hours per week for an employee who is not allowed to work overtime, or a 10 hour daily limit for an employee whose work hours are restricted such as a truck driver) to satisfy a jurisdictional requirement. Other compliance parameters may be used to derive or generate a compliance rule.

The one or more compliance parameters 802 can be imported to the one or more compliance objects (data) 804 so that one or more compliance rules can be parameterized for a particular jurisdiction object. For example, conditions associated with the one or more compliance objects (data) 804 may be stored as an expression tree in a database separately from the one or more compliance parameters 802, which may be stored in a separate database. By storing the rule logic as an expression tree in a database, it is possible to change the rules without requiring a code change or a deployment with sufficient validations which allows for a rule builder that can manage rules as configs in a database and decouple a rule addition/change from code or the deployment. The decoupling of rules from code and the one or more compliance parameters 802 at a jurisdictional level also makes it possible for non-developers to edit or set rule definitions via config and set the one or more compliance parameters 802 for a jurisdiction without changes to a codebase.

The one or more compliance objects (data) 804 may include different compliance data for various jurisdictions (e.g., compliance data for cities, counties, parishes, states, provinces, countries, etc.). The one or more compliance objects (data) 804 can include different compliance conditions and data for various areas of compliance (e.g., compliance with sick leave requirements for a particular jurisdiction, compliance with vacation leave requirements for a particular jurisdiction, compliance with family leave requirements for a particular jurisdiction, compliance with licensing requirements for a particular jurisdiction, compliance with overtime requirements for a particular jurisdiction, compliance with termination pay requirements for a particular jurisdiction, etc.). The one or more compliance objects (data) 804 can include conditions and properties relating to ordinances, regulations, rules, laws, etc. which relate to various compliance requirements of the organization and/or its employees. For example, a property of a compliance object may include a time for resolving a compliance infraction or a name of a compliance rule. The one or more compliance objects (data) 804 may also correspond to the compliance data 205 previously discussed. The one or more compliance objects (data) 804 may be associated with the one or more jurisdiction objects (data) 806, for example. For example, one or more compliance objects (data) 804 may be mapped to one or more jurisdiction objects (data) 806, or vice versa.

The one or more jurisdiction objects (data) 806 may be defined based on jurisdictional information which identifies an area, region, etc., in which one or more ordinance, rules, regulations, laws, etc. may apply to the organization and/or an employee of the organization. The identifying information may include, for example, a country and a state (e.g., Jurisdiction—USJurisdiction—CaliforniaStateJurisdiction). The one or more jurisdiction objects (data) 806 may also correspond to the jurisdiction data 206 previously discussed. The one or more jurisdiction objects (data) 806 may be associated with the one or more compliance objects (data) 804, for example. For example, one or more compliance objects (data) 804 may be mapped to one or more jurisdiction objects (data) 806, or vice versa.

For example, the one or more employee objects (data) 808 can include the number of employees at the organization, the age of the employees, the gender of the employees, the position or job title of the employees, an exemption status of the employees, family information of the employees, licenses and/or certifications held by the employees, work schedule information of the employees, pay information of the employees, leave information of the employees (e.g., vacation leave, sick leave, maternity/paternity leave, etc.), benefits information of the employees, and any other relevant information that may be required or useful for determining compliance of an employee with respect to various compliance rules for a particular jurisdiction.

For example, the one or more compliance rules for one or more jurisdictions 810 may be generated according to the one or more compliance objects (data) 804 and the one or more jurisdiction objects (data) 806. The one or more compliance rules for one or more jurisdictions 810 may include one or more conditions, one or more compliance parameters, an identification of the associated jurisdiction, a name of the compliance rule, one or more properties associated with the rule, and the like. The one or more compliance rules may include query expressions that are expressed in a query language and determining compliance with the one or more compliance rules may include evaluating the query expressions against a data object graph to return one or more query results. Furthermore, evaluating the query expressions may include traversing the data object graph. The data object graph may correspond to object graph data structure 315, for example, which may be based on organizational data 311. For example, such data object graphs can include one or more nodes representing entities associated with the organizational data 311 and one or more edges that connect and represent relationships between the nodes (e.g., explicit edges defining relationships between entities and data, virtual edges inferring relationships between entities and data, etc.).

In an example, a compliance rule may be conditioned on various compliance parameters (e.g., the number of employees in the organization, the number of employees in the organization located in the applicable jurisdiction, whether an employee has an exempt status, a minimum wage threshold value, a minimum sick leave amount per a preset duration of hours worked, a minimum vacation leave amount per a preset duration of hours worked, a specified amount rate of pay for remaining sick leave and/or vacation leave upon termination, a specified amount of maternity and/or paternity leave, an expiration or renewal date for a license and/or certification, a value for a number of training hours required for a given duration of time (e.g., continuing legal education hours required in a year), and so on).

The computing system (e.g., the computing system 110) performs one or more compliance evaluations 812 according to the one or more employee objects (data) 808 and the one or more compliance rules for one or more jurisdictions 810. The one or more compliance evaluations 812 whether an organization and/or employee is in compliance with one or more compliance rules for one or more jurisdictions. Compliance is evaluated by the compliance evaluation system 800 according to a set of conditions operating on employee information (e.g., an employee role, an employee age, an employee status, an employee salary, etc.) and company data (e.g., a size of the company), and the thresholds set in the compliance parameters imported to the one or more compliance objects for the one or more applicable jurisdiction objects. An output can be provided regarding the determination of the one or more compliance evaluations as previously discussed so that appropriate action can be taken based on the results.

Numerous details are set forth in the foregoing description. However, it will be apparent to one of ordinary skills in the art having the benefit of this disclosure that the disclosure may be practiced without these specific details. In some instances, structures and devices are shown in block diagram form, rather than in detail, to avoid obscuring the disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "obtaining," "parsing," "analyzing," "accessing," "determining," "identifying," "adjusting," "modifying," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the disclosed subject matter has been described in detail with respect to various example embodiments, each example is provided by way of explanation, not limitation of the disclosure. Those skilled in the art, upon attaining an understanding of the foregoing, can readily produce alterations to, variations of, and equivalents to such embodiments. Accordingly, the disclosure does not preclude inclusion of such modifications, variations and/or additions to the disclosed subject matter as would be readily apparent to one of ordinary skill in the art. For instance, features illustrated or described as part of one embodiment can be used with another embodiment to yield a still further embodiment. Thus, it is intended that the disclosure covers such alterations, variations, and equivalents.

What is claimed is:

1. A computing system for determining compliance for an organization, the computing system comprising:

one or more processors; and one or more non-transitory computer-readable media that collectively store instructions that, when executed by the one or more processors, cause the computing system to perform operations including:

accessing, from organizational data stored in one or more databases, employee information associated with a first employee object from among a plurality of employee objects included in the organizational data, and based on receiving information associated with one or more inputs to a user interface of a computing device selecting at least one of a first jurisdiction among a plurality of jurisdictions or one or more first compliance parameters among one or more compliance parameters included in the organizational data:

accessing, from the organizational data, jurisdictional information associated with a first jurisdiction object from among a plurality of jurisdiction objects included in the organizational data, the first jurisdiction object being associated with the first jurisdiction, importing the one or more first compliance parameters relating to the first jurisdiction object to generate, via compliance rule logic stored as an expression tree and without causing a change to a codebase, one or more compliance rules parameterized for the first jurisdiction object, wherein the one or more compliance rules are decoupled from code in the codebase and include query expressions that are expressed in a query language, determining compliance with the one or more compliance rules parameterized for the first jurisdiction object with respect to the first employee object by evaluating the query expressions against a data object graph to return one or more query results, based on the employee information and the one or more first compliance parameters, and based on determining the one or more compliance rules parameterized for the first jurisdiction object are not being complied with, automatically electronically controlling computing access and/or availability of one or more computing resources associated with at least one of the organization or a first employee associated with the first employee object to be changed by:

controlling at least one computing resource associated with the first employee and/or the organization to be restricted from access by the first employee, controlling one or more physical organizational machine assets to be restricted from access by the first employee, or controlling one or more organizational computing applications to restrict or prevent certain organizational management functions from being performed with respect to the first employee.

2. The computing system of claim 1, wherein the operations of importing and determining are triggered by and performed based on at least one of a change in the employee information associated with the first employee object or a change in the one or more compliance rules parameterized for the first jurisdiction object, via one or more inputs to the user interface.

3. The computing system of claim 1, wherein evaluating the query expressions against the data object graph to return one or more query results includes traversing the data object graph.

4. The computing system of claim 1, wherein based on the employee information associated with the first employee object being updated via one or more inputs to the user interface to indicate that the first employee has moved from a second jurisdiction among the plurality of jurisdictions to the first jurisdiction, the computing system is to perform the operations of importing the one or more compliance parameters relating to the first jurisdiction object and of determining compliance with the one or more compliance rules parameterized for the first jurisdiction object with respect to the first employee object, based on the updated employee information and the one or more compliance parameters.

5. The computing system of claim 1, wherein the jurisdictional information associated with the first employee object includes geographic information about the first jurisdiction in which the first employee is employed, and the one or more compliance rules parameterized for the first jurisdiction object include at least one of minimum wage rules, vacation leave rules, overtime rules, sick leave rules, licensing rules, or termination rules.

6. The computing system of claim 1, wherein the one or more first compliance parameters relating to the first jurisdiction object include at least one of a company size for which a given compliance rule is applicable, a threshold value for a compensation amount during a given time period, an employee exemption status, or date information for which the one or more compliance rules are applicable.

7. The computing system of claim 1, wherein, based on determining the one or more compliance rules parameterized for the first jurisdiction object are not being complied with when the one or more compliance rules parameterized for the first jurisdiction object are not being complied with, controlling, by the computing system, an alert of one or more compliance infractions to be provided for presentation on at least one of the user interface of the computing device or a user interface of the computing resource associated with the first employee and/or the organization.

8. The computing system of claim 1, wherein the operations further comprise:

determining the one or more compliance rules are complied with subsequent to automatically electronically controlling the computing access and/or the availability of the one or more computing resources; and based on determining the one or more compliance rules are complied with, automatically electronically controlling the one or more computing resources to be restored to a state prior to electronically controlling the computing access and/or the availability of the one or more computing resources based on determining the one or more compliance rules parameterized for the first jurisdiction object are not being complied with.

9. A computer-implemented method, comprising:

accessing, by a computing system comprising one or more processors, from organizational data stored in one or more databases, employee information associated with a first employee object from among a plurality of employee objects included in the organizational data; and based on receiving information associated with one or more inputs to a user interface of a computing device selecting at least one of a first jurisdiction among a plurality of jurisdictions or one or more first compliance parameters among one or more compliance parameters included in the organizational data:

accessing, from the organizational data, jurisdictional information associated with a first jurisdiction object from among a plurality of jurisdiction objects included in the organizational data, the first jurisdiction object being associated with the first jurisdiction, importing the one or more first compliance parameters relating to the first jurisdiction object to generate, via compliance rule logic stored as an expression tree and without causing a change to a codebase, one or more compliance rules parameterized for the first jurisdiction object, wherein the one or more compliance rules are decoupled from code in the codebase and include query expressions that are expressed in a query language, determining compliance with the one or more compliance rules parameterized for the first jurisdiction object with respect to the first employee object by evaluating the query expressions against a data object graph to return one or more query results, based on the employee information and the one or more first compliance parameters, and based on determining the one or more compliance rules parameterized for the first jurisdiction object are not being complied with, automatically electronically controlling computing access and/or availability of one or more computing resources associated with at least one of the organization or a first employee associated with the first employee object to be changed by:

controlling at least one computing resource associated with the first employee and/or the organization to be restricted from access by the first employee, controlling one or more physical organizational machine assets to be restricted from access by the first employee, or controlling one or more organizational computing applications to restrict or prevent certain organizational management functions from being performed with respect to the first employee.

10. The computer-implemented method of claim 9, wherein the importing and the determining are triggered by and performed based on at least one of a change in the employee information associated with the first employee object or a change in the one or more compliance rules parameterized for the first jurisdiction object, via one or more inputs to the user interface.

11. The computer-implemented method of claim 9, wherein controlling the at least one computing resource associated with the first employee and/or the organization to be restricted from access by the first employee by at least one of disabling the computing resource associated with the first employee and/or the organization or disabling a log-in page of the computing resource with respect to the first employee, controlling the one or more physical organizational machine assets to be restricted from access by the first employee includes at least one of controlling a vehicle to be locked when the first employee attempts to access the vehicle, controlling a key held by the first employee to be disabled, or locking supplies belonging to the organization from access by the first employee, and controlling the one or more organizational computing applications to restrict or prevent certain organizational management functions from being performed with respect to the first employee includes at least one of preventing the first employee from clocking-in or preventing the organization from scheduling the first employee for work.

12. The computer-implemented method of claim 9, wherein based on the employee information associated with the first employee object being updated via one or more inputs to the user interface to indicate that the first employee has moved from a second jurisdiction among the plurality of jurisdictions to the first jurisdiction, importing the one or more compliance parameters relating to the first jurisdiction object and compliance with the one or more compliance rules parameterized for the first jurisdiction object with respect to the first employee object, based on the updated employee information and the one or more compliance parameters.

13. The computer-implemented method of claim 9, wherein the jurisdictional information associated with the first employee object includes geographic information about the first jurisdiction in which the first employee is employed, and the one or more compliance rules parameterized for the first jurisdiction object include at least one of minimum wage rules, vacation leave rules, overtime rules, sick leave rules, licensing rules, or termination rules.

14. The computer-implemented method of claim 9, wherein the one or more first compliance parameters relating to the first jurisdiction object include at least one of a company size for which a given compliance rule is applicable, a threshold value for a compensation amount during a given time period, an employee exemption status, or date information for which the one or more compliance rules are applicable.

15. The computer-implemented method of claim 9, wherein, based on determining the one or more compliance rules parameterized for the first jurisdiction object are not being complied with when the one or more compliance rules parameterized for the first jurisdiction object are not being complied with, controlling an alert of one or more compliance infractions to be provided for presentation on at least one of the user interface of the computing device or a user interface of the computing resource associated with the first employee and/or the organization.

16. The computer-implemented method of claim 15, further comprising:

determining a time to cure the one or more compliance infractions; and providing one or more notifications to one or more employees of the organization including the first employee indicating the time to cure the one or more compliance infractions.

17. The computer-implemented method of claim 9, further comprising:

determining the one or more compliance rules are complied with subsequent to automatically electronically controlling the computing access and/or the availability of the one or more computing resources; and based on determining the one or more compliance rules are complied with, automatically electronically controlling the one or more computing resources to be restored to a state prior to electronically controlling the computing access and/or the availability of the one or more computing resources based on determining the one or more compliance rules parameterized for the first jurisdiction object are not being complied with.

18. The computer-implemented method of claim 9, wherein the importing the one or more first compliance parameters relating to the first jurisdiction object to generate the one or more compliance rules parameterized for the first jurisdiction object includes:

receiving, by the computing system, information associated with one or more further inputs to the user interface which is configured to display one or more settable parameters for configuring the one or more compliance rules for the first jurisdiction object, wherein the one or more settable parameters include at least one of a company size for which a given compliance rule is applicable, a threshold value for a compensation amount during a given time period, an employee exemption status, or date information for which the one or more compliance rules are applicable, and generating, by the computing system, the one or more compliance rules parameterized for the first jurisdiction object based at least in part on the one or more further inputs.

19. One or more tangible non-transitory computer-readable media storing computer-readable instructions that when executed by one or more processors cause the one or more processors to perform operations, the operations comprising:

accessing, from organizational data stored in one or more databases, employee information associated with a first employee object from among a plurality of employee objects included in the organizational data; and based on receiving information associated with one or more inputs to a user interface of a computing device selecting at least one of a first jurisdiction among a plurality of jurisdictions or one or more first compliance parameters among one or more compliance parameters included in the organizational data:

accessing, from the organizational data, jurisdictional information associated with a first jurisdiction object from among a plurality of jurisdiction objects included in the organizational data, the first jurisdiction object being associated with the first jurisdiction, importing the one or more first compliance parameters relating to the first jurisdiction object to generate, via compliance rule logic stored as an expression tree and without causing a change to a codebase, one or more compliance rules parameterized for the first jurisdiction object, wherein the one or more compliance rules are decoupled from code in the codebase and include query expressions that are expressed in a query language, determining compliance with the one or more compliance rules parameterized for the first jurisdiction object with respect to the first employee object by evaluating the query expressions against a data object graph to return one or more query results, based on the employee information and the one or more first compliance parameters, and based on determining the one or more compliance rules parameterized for the first jurisdiction object are not being complied with, automatically electronically controlling computing access and/or availability of one or more computing resources associated with at least one of the organization or a first employee associated with the first employee object to be changed by:

controlling at least one computing resource associated with the first employee and/or the organization to be restricted from access by the first employee, controlling one or more physical organizational machine assets to be restricted from access by the first employee, or controlling one or more organizational computing applications to restrict or prevent certain organizational management functions from being performed with respect to the first employee.

20. The one or more tangible non-transitory computer-readable media of claim 19, wherein the importing and the determining are triggered by and performed based on at least one of a change in the employee information associated with the first employee object or a change in the one or more compliance rules parameterized for the first jurisdiction object, via one or more inputs to the user interface.

* * * * *